United States Patent

[11] 3,622,305

| [72] | Inventor | Kurt Becker<br>Obernkirchen, Germany |
|---|---|---|
| [21] | Appl. No. | 716,196 |
| [22] | Filed | Mar. 26, 1968 |
| [45] | Patented | Nov. 23, 1971 |
| [73] | Assignee | Herman Heye<br>Obernkirchen, Germany |
| [32] | Priority | Apr. 1, 1967 |
| [33] | | Germany |
| [31] | | H 62338 |

[54] MACHINE FOR THE PRODUCTION OF CONTAINERS OR THE LIKE OF VITREOUS MATERIAL
21 Claims, 30 Drawing Figs.

[52] U.S. Cl. .................................................... 65/229,
65/231, 65/232, 65/237, 65/234, 65/241, 65/361,
65/184, 65/362
[51] Int. Cl. ...................................................... C03b 9/00,
C03b 11/06
[50] Field of Search ........................................... 65/229,
243, 230, 231, 232, 233–242, 361, 184, 237, 238,
362

[56] References Cited
UNITED STATES PATENTS

| 1,875,202 | 8/1932 | Aftergut ....................... | 65/233 X |
| 1,904,959 | 4/1933 | Soubier ........................ | 65/242 X |
| 1,943,195 | 1/1934 | Van Ness ...................... | 65/184 |
| 2,289,999 | 7/1942 | Schutz .......................... | 65/230 X |
| 2,327,673 | 8/1943 | Shillinger ..................... | 65/232 X |
| 2,328,873 | 9/1943 | Young ........................... | 65/233 |
| 2,388,876 | 11/1945 | Smith ............................ | 65/234 X |
| 2,556,237 | 6/1951 | Teichmann ................... | 65/243 |
| 2,874,516 | 2/1959 | Youkers ....................... | 65/232 |
| 3,434,820 | 3/1969 | Zappia et al. ................. | 65/229 X |

*Primary Examiner*—Frank W. Miga
*Attorney*—Michael S. Striker

ABSTRACT: A press-and-blow container making machine wherein one of two rotary tables supports a set of blank molds receiving gobs from a gob feed and the other rotary table supports a set of blow molds serving to convert parisons obtained from the blank molds into finished containers. An endless flexible conveyor carries neck rings which transport parisons from the first table, past a preliminary treating unit and on to the blow molds. The neck rings also transport finished containers away from the blow molds.

INVENTOR
Kurt BECKER
BY
Michael S. Striker
his ATTORNEY

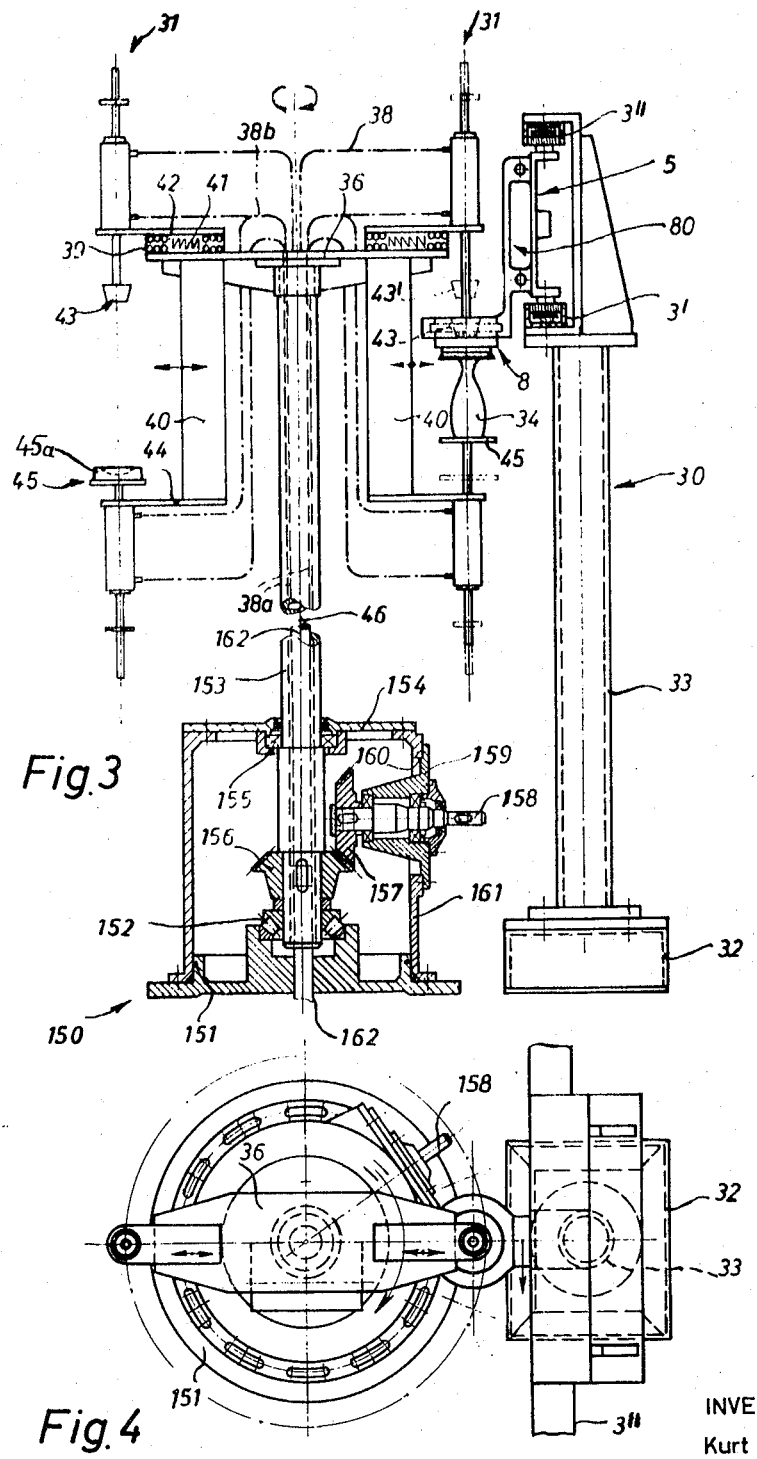

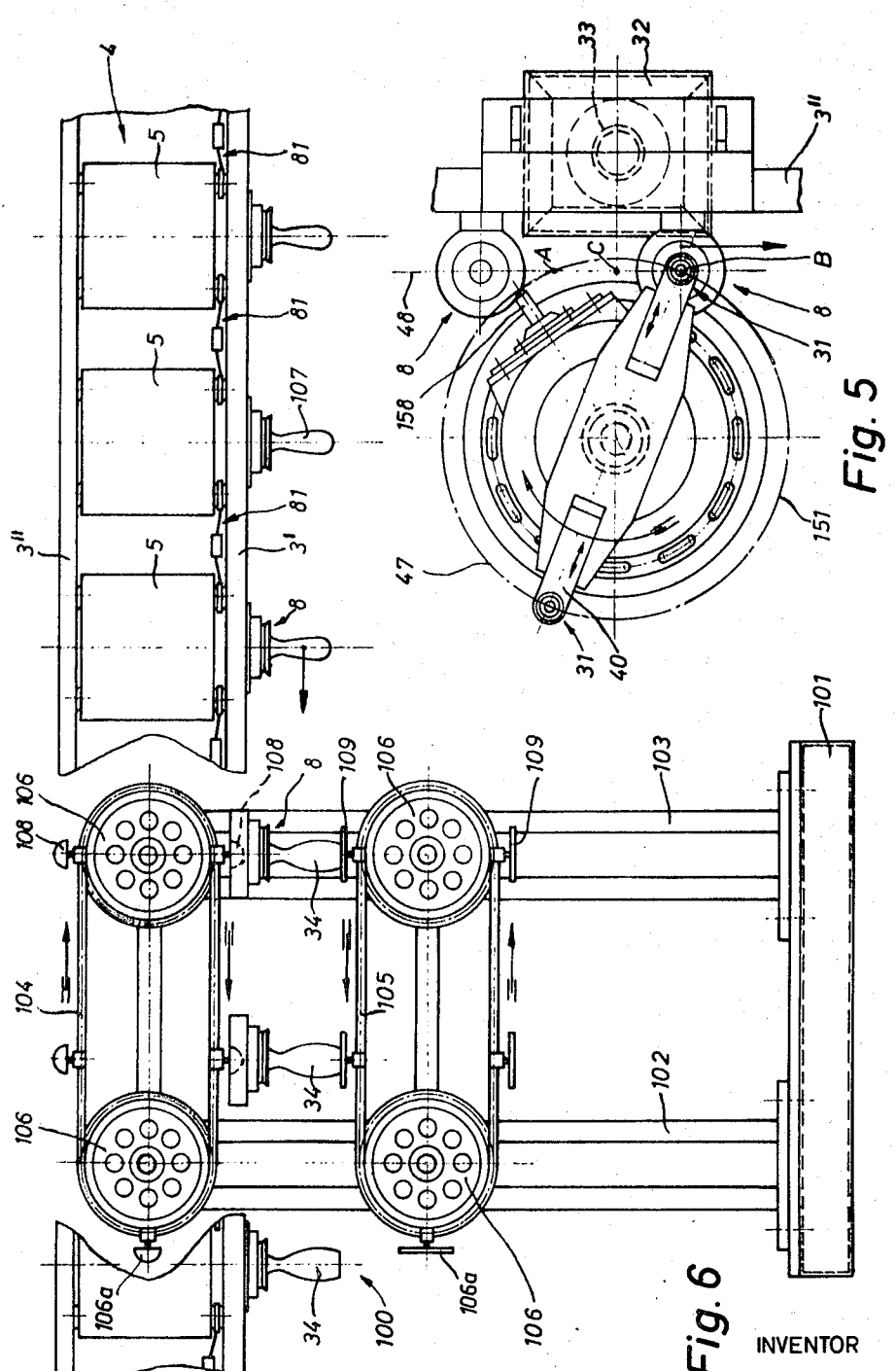

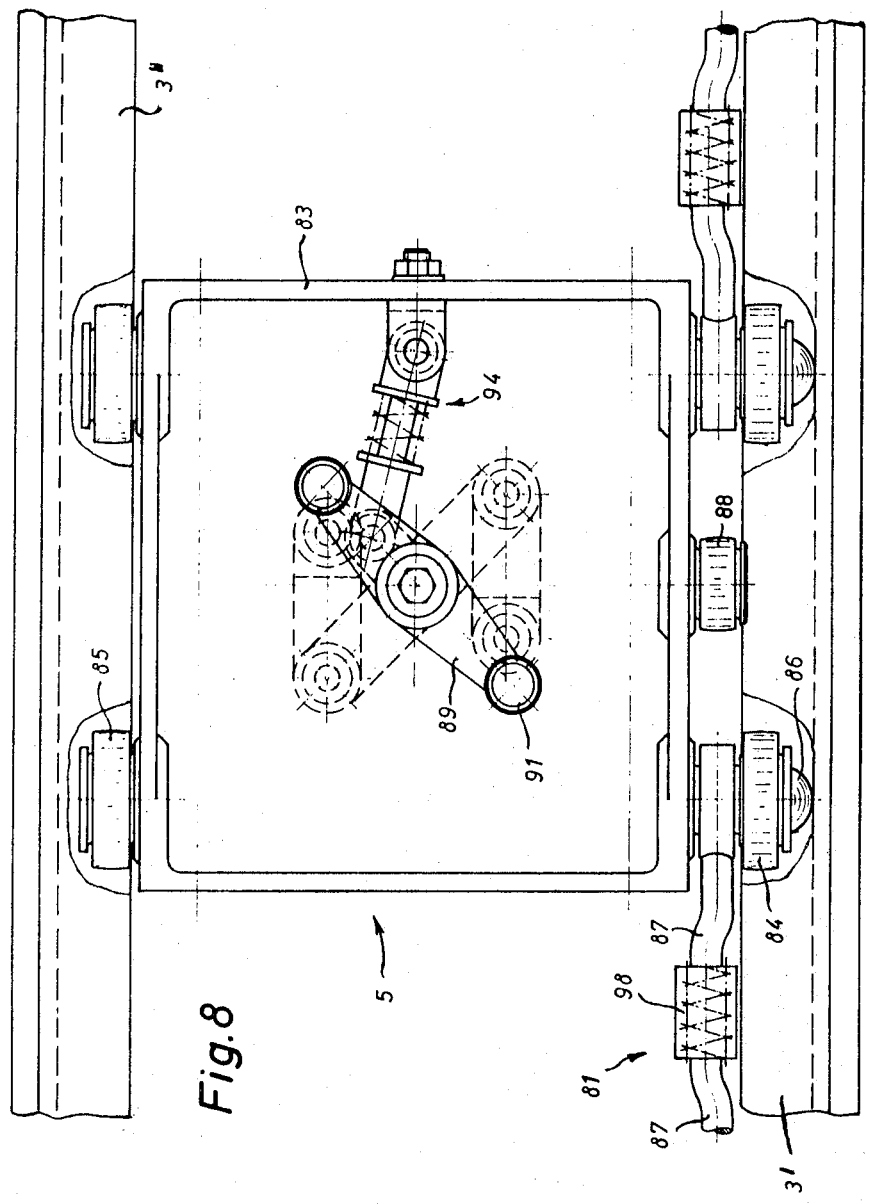

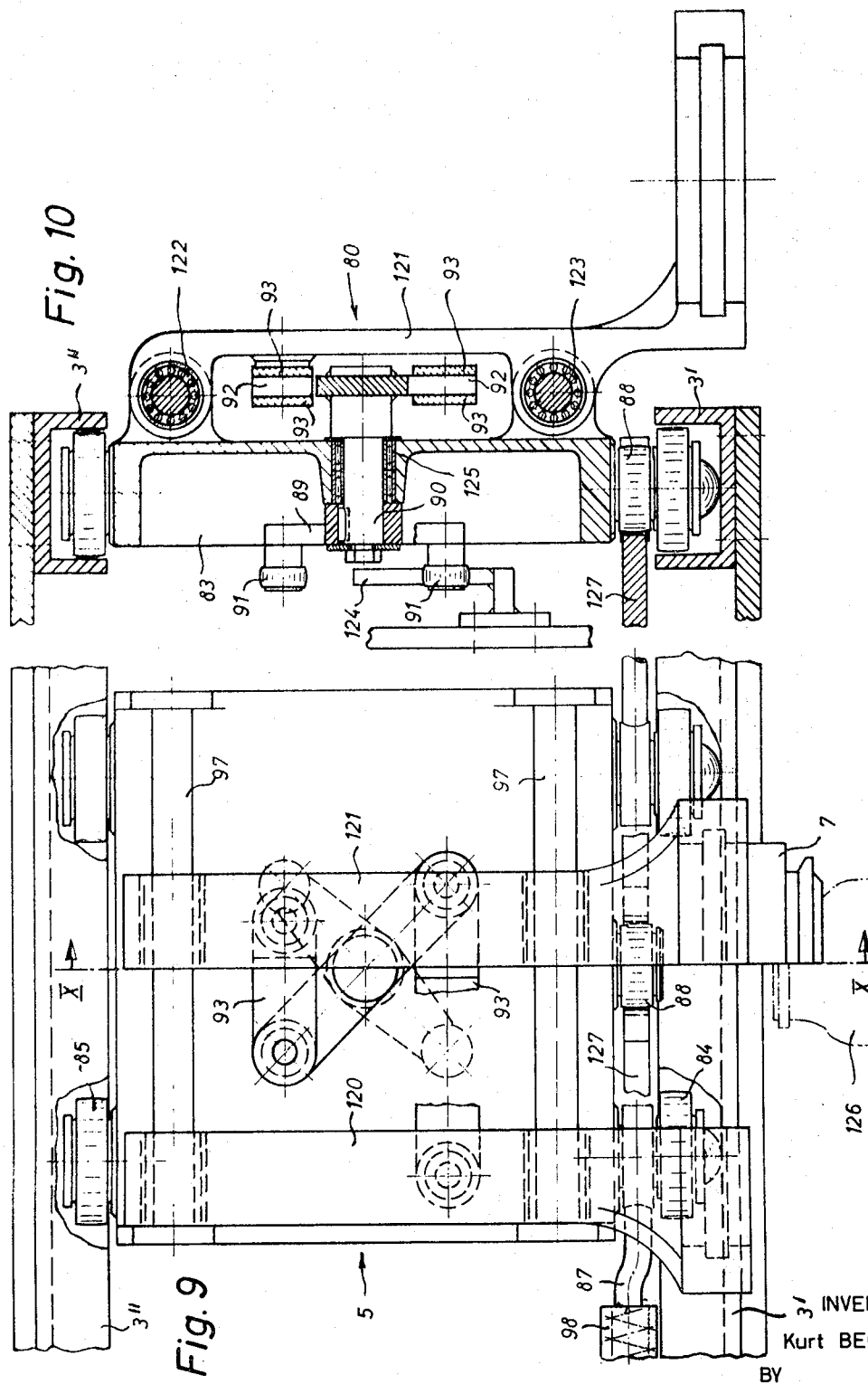

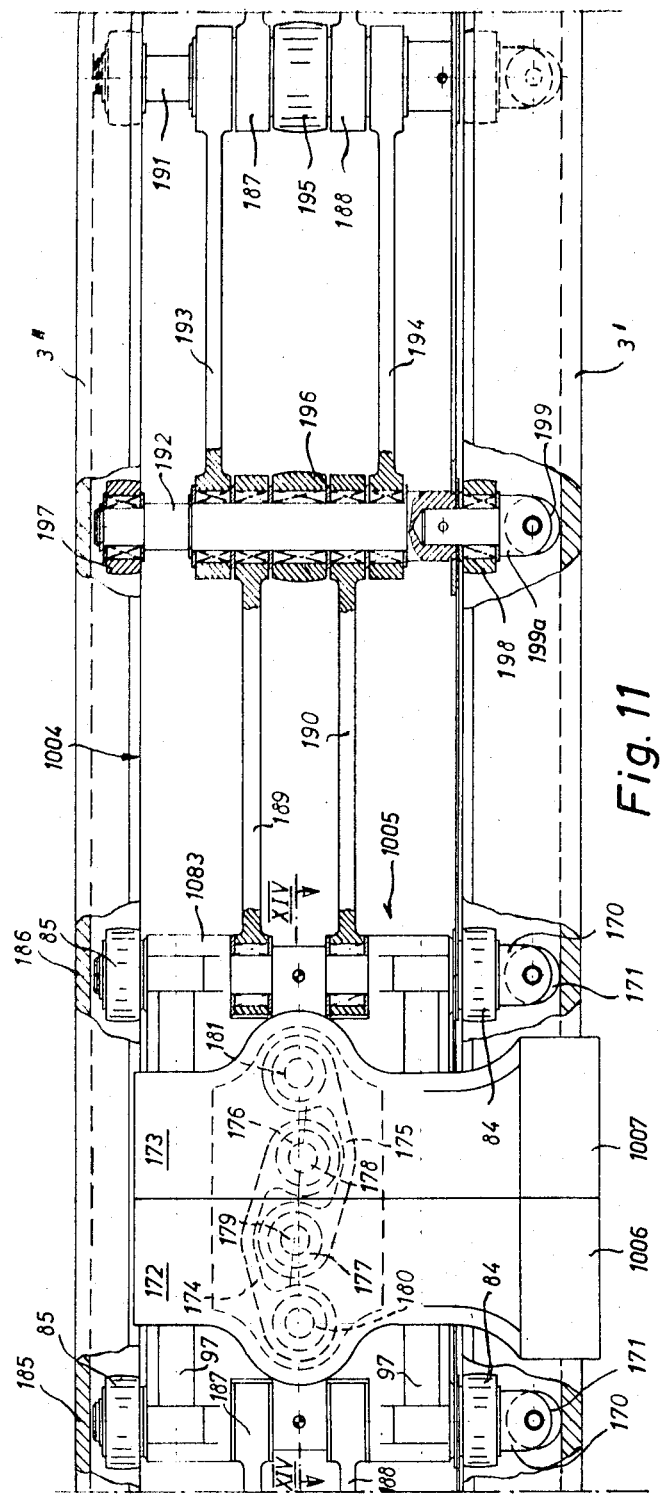

INVENTOR
Kurt BECKER
BY his ATTORNEY

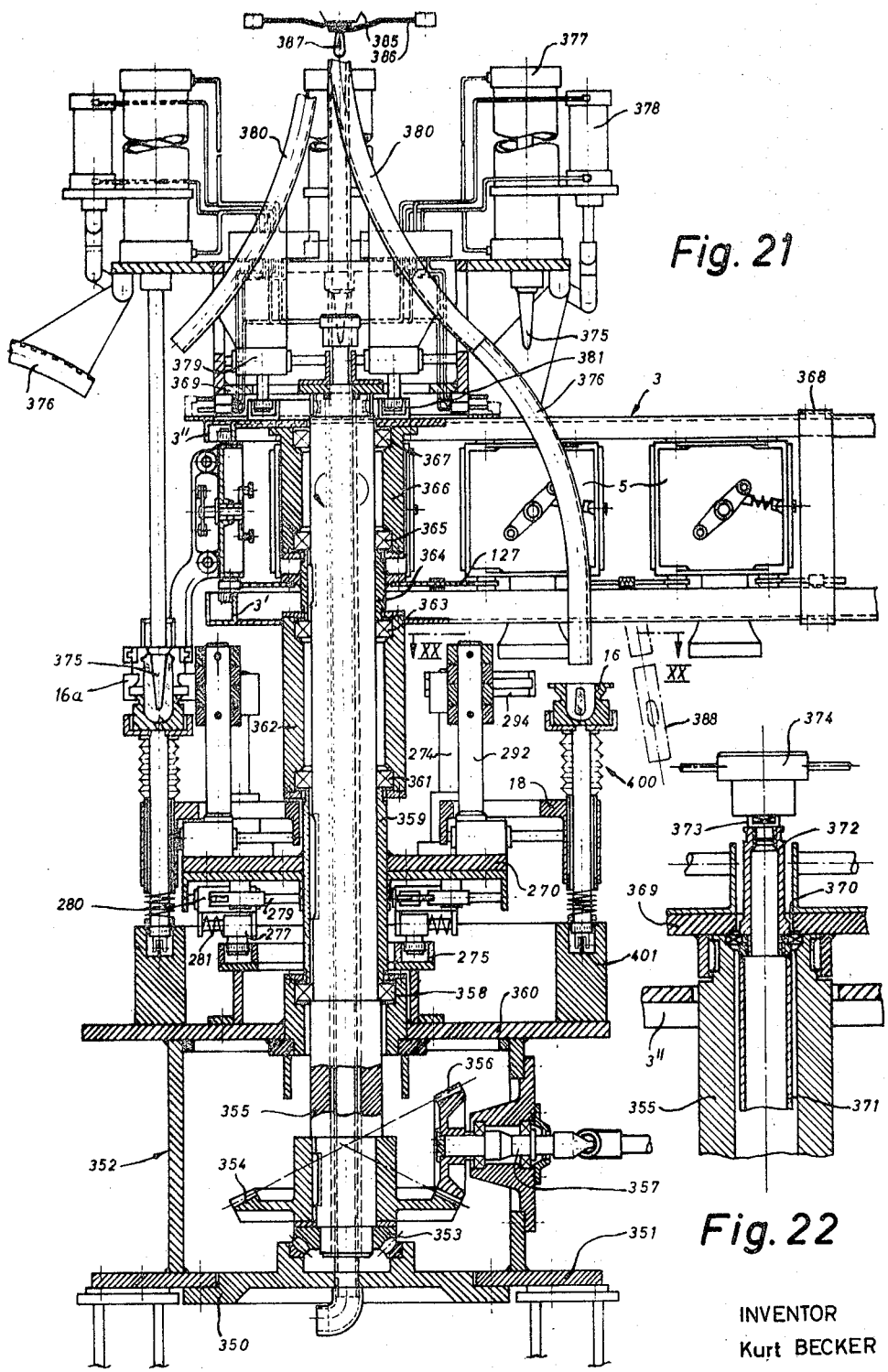

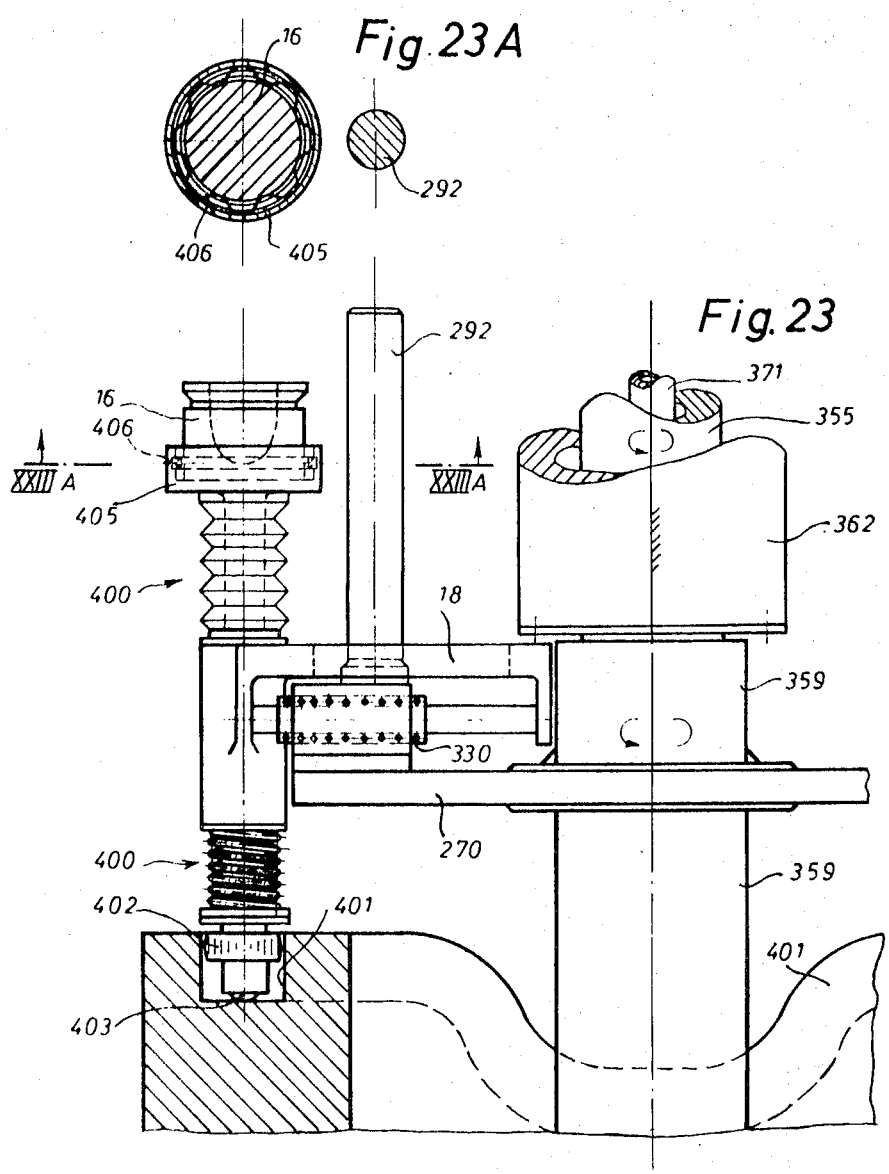

INVENTOR
Kurt BECKER

MACHINE FOR THE PRODUCTION OF CONTAINERS OR THE LIKE OF VITREOUS MATERIAL

BACKGROUND OF THE INVENTION

The present invention relates to a machine for the production of hollow articles from plasticized material, and more particularly to improvements in press-and-blow machines for the manufacture of bottles of like containers from vitreous material. Still more particularly, the invention relates to improvements in fully automatic container making machines.

A conventional press-and-blow container making machine is disclosed on pages 326–335 of "Glascmaschinen, Aufbau and Betrieb der Maschinen zur Formgebung des heissen Glases" by W. Giegerich and W. Trier, published in 1964 by Springer-Verlag. This machine employs a single table with 12 stations each of which accommodates all components necessary to form a finished container including a blank mold, a neck ring, a plunger, means for rotating the neck ring and the parison, a blow head, a blow mold comprising two mold sections and a bottom plate, and all the driving and control elements necessary for actuation of the just enumerated components. Thus, each station is fully equipped to form a hollow vitreous article but the components are used only during a small fraction of each revolution of the table. Therefore, the expenses involved in the manufacture of new molds and plungers are very high.

Another serious drawback of the just described conventional machine is that the speed of the table depends on the time required for reheating of parisons between the pressing and final blowing stages of a cycle. In the production of thin-walled containers, the interval for reheating subsequent to pressing must exceed a predetermined minimum period of time in order to insure equalization of temperatures in all zones of the parison and to thus achieve uniform viscosity prior to final blowing. Reheating of parison walls proceeds from the interior zone toward the exterior and, therefore, this step cannot be speeded up appreciably by auxiliary equipment. In presently known machines, satisfactory reheating is achieved by reducing the speed of the table or by increasing the dimensions of the machine. Thus, in turn, involves additional expenses from space and equipment and causes further lengthening of intervals during which the components at various stations are not in use.

SUMMARY OF THE INVENTION

It is an object of my invention to provide a novel and improved machine for automatic production of hollow vitreous articles which is simpler, more economical and whose output is higher than that of conventional machines.

Another object of the invention is to provide a machine which can be utilized for automatic production of hollow vitreous articles whose wall thickness is but a fraction of wall thickness of articles produced in conventional machines.

A further object of the invention is to provide a container making machine wherein the components are idle for much shorter periods of time than in presently known machines.

An additional object of the invention is to provide novel conveyor means for the neck rings, blank molds and blow molds of a container making machine.

Briefly outlined, my invention is embodied in a press-and-blow machine which is particularly suited for automatic production of containers or like hollow articles from vitreous material. The machine comprises a plurality of separate rotor assemblies (called tables) which are spaced from each other and each of which is provided with shaping means for performing selected operations necessary to convert batches (gobs) of plasticized material into parisons or analogous semifinished articles and to thereupon convert the parisons into finished hollow articles by blowing, and endless flexible conveyor means having transporting devices for transporting parisons between the rotor assemblies. A first rotor assembly may be provided with shaping means (known as blank molds) for converting batches successively delivered by a gob feed into parisons, and a second rotor assembly may be provided with shaping means (blow molds) for converting parisons into thin-walled containers. At least one auxiliary assembly may be provided for subjecting parisons to a preliminary treatment during travel of such parisons with the conveyor means from the first to the second rotor assembly. The auxiliary assembly may be provided with a turntable or a set of belt or chain conveyors for at least one blowing unit including a bottom member which can support from below parisons transported by the conveyor means and a blowing head arranged to admit pressurized fluid into parisons supported by the bottom member.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged vertical sectional view as seen in the direction of arrows from the line III—III of FIG. 2 and illustrate the details of the auxiliary treating station;

FIG. 4 is a top plan view of the structure shown in FIG. 3;

FIG. 5 is a similar top plan view but showing a turntable at the treating station in a different angular position;

FIG. 6 is side elevational view of a modified auxiliary treating station;

FIG. 8 is a rear elevational view of the carriage;

FIG. 9 is a view similar to that of FIG. 7 but further showing a neck ring suspended on the frame of the carriage;

FIG. 10 is a vertical sectional view as seen in the direction of arrows from the line X—X of FIG. 9;

FIG. 11 is a fragmentary partly elevational and partly sectional view of a modified conveyor;

FIG. 21 is an enlarged vertical sectional view of a station at which the blank molds receive molten glass from the gob feed;

FIG. 22 is an enlarged view of a detail of the structure shown in FIG. 21;

FIG. 23 is an enlarged view of a detail of the structure shown in FIG. 21, there being shown an elastic strut which supports a blank mold;

FIG. 23A is a horizontal sectional view as seen in the direction of arrows from the line XXIIIA—XXIIIA of FIG. 23;

DESCRIPTION OF THE PREFERRED EMBODIMENTS

Figure 1:
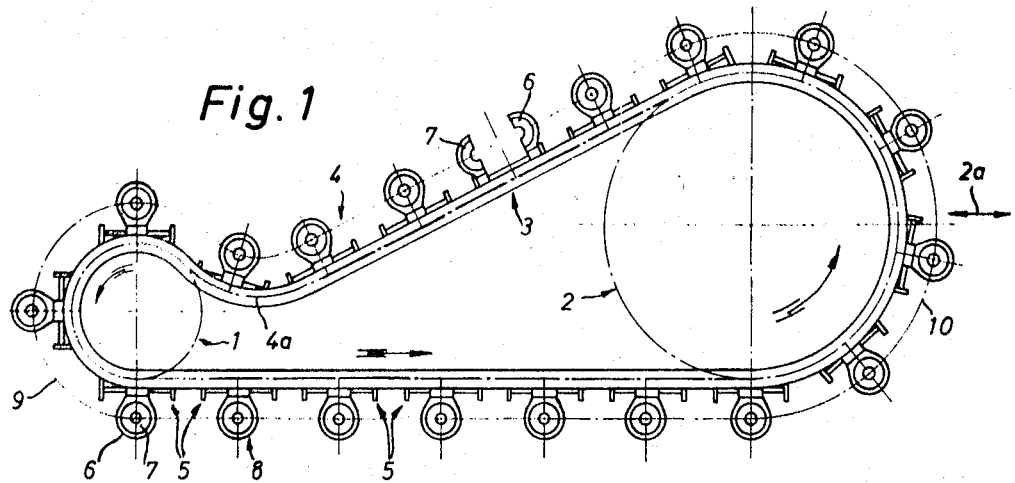
FIG. 1 is a schematic top plan view of a two-table press-and-blow container making machine which embodies one form of my invention and wherein the neck rings are transported by an endless conveyor whose chain travels around both tables.
Figure 2:
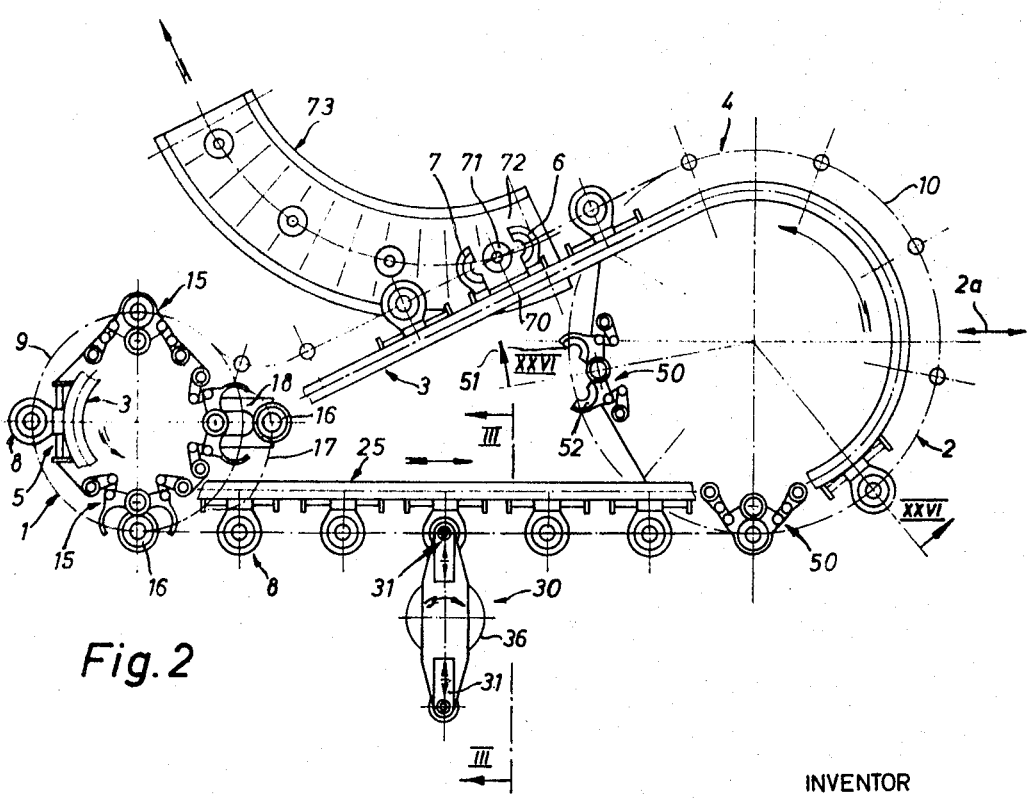
FIG. 2 is a similar top plan view but with portions of the tables broken away and further showing a preliminary or auxiliary treating station adjacent to the path along which the neck rings travel from the table for blank molds to the table for blow molds, the section through the right-hand table being taken along the line II—II of FIG. 26.

FIGS. 1 and 2 illustrate a so-called press-and-blow bottle making machine with two rotor assemblies 1 and 2 (hereinafter called tables for short) which respectively carry blank molds 16 for reception of batches or gobs of plasticized vitreous material land blow molds (having sections 51, 52) for final blowing of semifinished articles or parisons. The directions in which the tables 1 and 2 rotate are indicated by arrows. A stationary guide or track 3 is provided to guide the chain of an endless flexible conveyor 4. The chain has a series of carriages or dollies 5 and its end turns extend concentrically with the tables 1 and 2. This chain is trained around sprocket wheels (not shown in FIG. 1) which are coaxial with the tables 1 and 2. The extent to which the chain travels along arcuate paths which are concentric with the tables 1 and 2 may be varied. The length of such paths depends on the diameters of tables and on the mounting of sections of the track 3. As shown in FIG. 1, a portion of the track 3 immediately upstream of the table 1 is concave, as at 4a, so that the left-hand end turn of the chain of the conveyor 4 forms a loop of nearly 270 degrees and surrounds the major portion of the table 1. The loop at the right-hand end turn of the chain extends an arc of slightly more than 180 degrees. The left-hand loop is smaller because the diameter of the table 1 is smaller than that of the table 2.

The carriage or dollies 5 can form the links of the chain in the conveyor 4 or they may be articulately connected to each other by links. Each of these carriages 5 supports two sections or halves 6, 7 of a composite transporting member here shown as a neck ring 8. The two arcuate paths along which the centers of neck rings 8 travel at the end turns are respectively denoted by phantom-line circles 9 and 10.

In FIG. 2, portions of the track 3 are broken away adjacent to the tables 1 and 2 to expose certain parts which are installed below the track. The table 1 carries gripper means or tongs 15 which are shown in open and closed positions. Each half of each tongs 15 is provided with a hung-in portion (see the portion 16a in FIG. 21) of a center part of a blank mold or press mold 16. Such center part may serve to hold together the remaining parts of a mold or defines a portion of the mold cavity. Tongs 15 with center parts of different axial dimensions can be used to accommodate parisons of different length. FIG. 2 further shows a carriage or dolly 5 with a closed neck ring 8 at the nine o'clock position of the table 1. The neck ring 8 at the six o'clock position of the table 1 has been omitted to show a blank mold or press mold 16 which receives batches or gobs from a gob feeder. The blank molds 16 are connected with the table 1, i.e., they do not participate in the movement of the chain or conveyor 4 along the track 3. Each blank mold 16 normally travels along the path indicated by the phantom-line circle 9 and leaves such path only temporarily in the three o'clock position as shown in FIG. 2, i.e., in a region where the table 1 is not surrounded by the chain. The blank mold 16 then enters a filling station 17 where it receives a fresh gob. To this end, the blank molds 16 are mounted on platforms 18 which can move radially with reference to the axis of the table 1. The manner in which the platforms 18 are caused to move radially inwardly and outwardly will be described in connection with FIG. 23.

The track 3 has an elongated straight stretch 25 extending between the tables 1 and 2 wherein parisons obtained by deformation of gobs are "reheated," i.e., wherein heat travels from the interior toward the external surfaces of the parisons. The parisons which travel along the stretch 25 are carried by the neck rings 8. The reheating time can be varied without changing the speed of the conveyor 4 because one of the tables is movable toward or away from the other table and because the conveyor 4 and track 3 can be made longer or shorter by insertion or removal of sections or links. In the illustrated embodiment, the table 2 is movable nearer to or further away from the table 1 as indicated by the arrow 2a. The required reheating time will depend on the size, wall thickness and composition of parisons.

In accordance with a feature of the present invention, parisons traveling along the stretch 25 of the track 3 can be subjected to one or more preliminary treatments, for example, to a first blow, and such treatment or treatments are completed before the respective neck rings 8 reach the table 2. FIG. 2 shows a treating station 30 which accommodates a first or auxiliary blowing assembly located substantially midway between the ends of the stretch 25. This blowing auxiliary assembly includes a turntable 36 and its details will be described fully in connection with FIGS. 3 to 5.

The table 2 carries a second or final blowing assembly and supports a set of gripper means or tongs 50 shown in FIG. 2 in fully open as well as in closed positions. Each of the tongs 50 carries two sections or halves 51, 52 of a blow mold. In the machine which is illustrated in FIGS. 1 and 2, the table 1 carries four equidistant blank molds 16 and the table 2 carries nine equidistant blow molds and associated mechanisms. The sections 6, 7 of the neck rings 8 are moved apart only once, namely along a stretch 70 of the track 3 where finished bottles 71 are released at a transfer station 72 to be deposited on a lehr conveyor 73 traveling in the direction indicated by arrow. The sections 6, 7 return to closed positions shortly after the respective neck ring 8 advances past the transfer station 72.

The first or auxiliary blowing assembly at the treating station 30 of FIG. 2 is illustrated in greater detail in FIGS. 3 to 5. It includes a stationary base or pedestal 32 for an upright column 33 which supports the upper and lower U-shaped rails 3'', 3' of the fixed track 3. The carriages or dollies 5 support holders 80 for the neck rings 8 whose sections 6, 7 support parisons 34. A gear box 150 of the blowing assembly at the treating station 30 is installed at the level of the pedestal 32. The bottom plate 151 of the gear box 150 supports a roller thrust bearing 152 for a hollow vertical drive shaft 153. The top portion of the shaft 153 supports the aforementioned turntable 36 and this shaft is further mounted in a radial ball bearing 155 installed in the cover plate 154 of the gear box 150. The drive for the hollow shaft 153 comprises a first bevel gear 156 which is rigid with the shaft 153 in the interior of the gear box 150 and a second bevel gear 157 which meshes with the bevel gear 156 and is mounted on an input shaft 158 installed in a bearing sleeve 159 which is affixed to and extends through an opening 160 in a sidewall 161 of the gear box 150. The input shaft 158 can receive torque from a variable-speed transmission (not shown) driven by a main prime mover which also drives the conveyor 4 and tables 1, 2, for example, through the intermediary of three variable-speed transmissions whereby the shaft 153 for the treating station 30 is driven in synchronism with the conveyor 4 and turntables 1 and 2.

The drive shaft 153 accommodates a supply pipe 162 which is affixed to the bottom plate 151 of the gear box 150 and is surrounded by a suitable radial bearing (not shown) for the shaft 153. The pipe 162 accommodates conduits 38a which supply and/or return a pressure medium for hydraulic or pneumatic actuating cylinders mounted on the turntable 36. Such cylinders actuate two blowing heads 43 and two blow mold bottom members or plates 45 each of which may carry a plate 45a for preliminary shaping of the bottom of a parison. The conduits 38a are connected with a distributor 38b on the turntable 36, and this distributor supplies pressure medium to conduits 38 which are directly connected with the aforementioned actuating cylinders for the blowing heads 43 and bottom plates 45. Each blowing head 43 forms with the respective bottom plate 45 a blowing unit 31, the two blowing units being disposed diametrically opposite each other with reference to the axis of the turntable 36. Each blowing unit 31 is movable radially of the drive shaft 153 between a retracted position (shown in the right-hand part of FIG. 3 or 4) and an extended position (shown in the left-hand part of FIG. 3 or 4). The blowing units 31 comprise U-shaped brackets or frame members 40 which are guided by guide means including sets of balls 39 for the aforementioned radial movements with reference to the shaft 153. Springs 41 bias the blowing units 31 to their extended or outer positions.

The blowing heads 43 are mounted on the upper flanges 42 of the respective frame members or brackets 40, and such upper flanges further carry certain other components of the actuating and centering means for the respective blowing heads 43. FIG. 3 illustrates the right-hand blowing head 43 in operative or lower end position by solid lines and in inoperative or upper end position by phantom lines, as at 43'.

The bottom members or plates 45 are mounted on the lower flanges 44 of the respective brackets 40, and the lower flanges 44 also carry the actuating and centering means for such bottom plates. Control of the actuating means for the blowing heads 43 and bottom plates 45 is effected automatically in response to rotation of the turntable 36, preferably by means of trips or cams which actuate valves or limit switches for the cylinders of the actuating means. As stated before, the cylinders which actuate the blowing heads 43 and bottom plates 45 receive a pressure medium from the distributor 38b through the intermediary of conduits 38. The bottom plates 45 and blowing heads 43 are movable vertically toward and away from each other. The bottom plates support the parisons from below while the blowing heads admit a pressure fluid. In this way, the bottom plates prevent excessive elongation of parisons.

The right-hand bracket 40 of FIG. 3 or 4 is shown in fully retracted position. This is due to the fact that a neck ring 8 is shown at a minimum distance from the axis 46 of the shaft 153. Since the circle 47 along which the centers of blowing heads 43 and bottom plates 45 (in extended positions of the respective blowing units 31) travel about the axis 46 of the shaft 153 intersects the path 48 for the centers of neck rings 8 at two points (see FIG. 5 where the path 48 for the neck rings 8 is indicated by a straight line and the points of intersection at A and B), the right-hand blowing unit 31 must be retracted and thereupon extended during travel of its parts 43, 45 from the point A to the point B in order to keep the parts 43, 45 in accurate alignment with the traveling neck ring 8 and hence with that parison 34 which is being transported by the neck ring. It will be noted that FIG. 5 shows both blowing units 31 in fully extended positions because the common axis of the parts 43, 45 of the right-hand blowing unit registers with the point B on the line 48, i.e., the parts 43, 45 are about to move away from registry with the neck ring 8 which continues to travel along the path indicated by the line 48. During travel from the point A to the point B of FIG. 5, the right-hand blowing unit 31 must move radially inwardly and then radially outwardly to maintain its blowing head 43 and bottom plate 45 in accurate registry with the adjoining neck ring 8. The parisons 34 are treated during travel between the points A and B. The point C on the line 48 is located midway between the points A and B; each bracket 40 moves radially inwardly during travel of the respective parts 43, 45 from the point A to the point C, and thereupon radially outwardly during travel of parts 43, 45 from the point C to the point B.

The drive for the shaft 153 is synchronized with the drive for the conveyor 4 in such a way that the parts 43, 45 of a blowing unit 31 register with a neck ring 8 at the exact moment when the neck ring reaches the point A on the line 48 and that the parts 43, 45 then continue to register with such neck ring during travel from the point A to the point B. The means for moving the brackets 40 radially inwardly against the opposition of springs 41 comprises one or more cams (not shown) which can be affixed to the rail 3' and/or 3'' or to another stationary part of the machine frame.

The stretch 25 of the conveyor 4 can advance the neck rings 8 and parisons 34 past two or more treating stations 30.

FIG. 6 shows a modified auxiliary blowing assembly 100 which can be used as a substitute for the blowing assembly of FIGS. 3–5. This modified auxiliary blowing assembly 100 comprises a base or pedestal 101 for two upright columns 102, 103 supporting a vertically adjustable endless belt or chain 104 for blowing heads 108 and a vertically adjustable endless belt or chain 105 for blow mold bottom members or plates 109. The belts or chains 104, 105 are trained around pulleys or sprocket wheels 106. The members 106 are driven (in a manner not shown in FIG. 6) in such a way that the speed of blowing heads 108 and bottom plates 109 equals the speed of neck rings 8.

Parisons 107 which are removed from the blank molds 16 travel with the neck rings 8 in a direction to the left, as viewed in FIG. 6, and past the auxiliary blowing assembly 100. The neck rings 8 are suspended on carriages or dollies 5 which travel along the rails 3', 3'' of the track 3. The dollies 5 and the elastic links 81 therebetween form part of the chain in the conveyor 4.

When a parison 107 reaches the auxiliary blowing assembly 100, the corresponding neck ring 8 is sealingly engaged by one of the spherically configurated blowing heads 108 which latter then admits air or other gas to effect expansion of the parison 107 whereby the latter forms a partially finished bottle 34. During such blowing, one of the bottom plates 109 registers with the blowing head 108 to prevent excessive elongation of the intermediate product 34. The latter is then transported toward the table 2 by moving to the left and beyond the blowing assembly 100. It is clear that the machine of my invention can comprise two or more auxiliary blowing assemblies 100 or one or more blowing assemblies 100 and one or more auxiliary blowing assemblies of the type shown in FIGS. 3–5.

The pulleys or sprocket wheels 106 for the belts or chains 104, 105 are adjustable with reference to the columns 102, 103 in directions transversely of the direction of travel of parisons 107 and 34 with the neck rings 8. The shafts of members 106 can be fixed in selected positions of adjustment by screws or like fasteners 106a. Such adjustability of the blowing heads 108 and bottom members 109 renders it possible to use the assembly for preliminary treatment of differently dimensioned parisons.

FIGS. 7 to 10 illustrate the construction and mounting of carriages or dollies 5. Each dolly 5 comprises a frame or casing 83 which carries two upper roller followers 85 extending with some clearance into and tracking the upper U-shaped rail 3'' and two lower roller followers 84 extending with some clearance into and tracking the lower U-shaped rail 3'. The lower roller followers 84 are formed with sockets for spherical auxiliary followers 86 which travel along the web of the lower rail 3' (see FIGS. 8 to 10) and transmit thereto the weight of the respective dolly 5.

The elastic links 81 of the chain in the conveyor 4 comprise pull rods 87 which are coupled to the frames 83. Each frame 83 further carries a roller 88 which is disposed between the lower roller followers 84 and performs the same function as the rollers of a customary chain, i.e., it can engage with the teeth of sprocket wheels rotatable with the tables 1 and 2 at the end turns of the chain. Such sprocket wheels are mounted coaxially with the tables 1 and 2 and at least one thereof is driven to continuously transport the dollies 5 along the track 3 at a constant or nearly constant speed.

The median portion of each frame 83 supports a horizontal shaft 90 which forms part of actuating means for the movable portions or arms 120, 121 of a holder 80 for neck rings 8. The shaft 90 carries a two-armed control lever 89 at one side of the frame 83 and a two-armed transfer level 92 at the other side of the frame. The levers 89, 92 are angularly offset by 90 degrees with reference to each other and the arms of the control lever 89 carry two roller followers 91. The arms of the transfer lever 92 are articulately coupled with motion transmitting rods 93 movable between two end positions respectively shown in FIG. 7 by solid and phantom lines. One arm of the control lever 89 is further connected with one end of a detent member 94. The other end of the detent member 94 is supported by a bearing block 95 which is affixed to the frame 83. The detent member 94 comprises a helical spring 96 so that it can yield to snap over as soon as it moves to a horizontal position in response to engagement of followers 91 with stationary cams whereby the motion transmitting rods 93 snap from the one to the other end position because the levers 89, 92 are affixed to the shaft 90. The frame 83 further carries upper and lower horizontal guides for the aforementioned portions or arms 120, 121 of the associated holder 80 for the sections 6, 7 of a neck ring 8.

Figure 7:
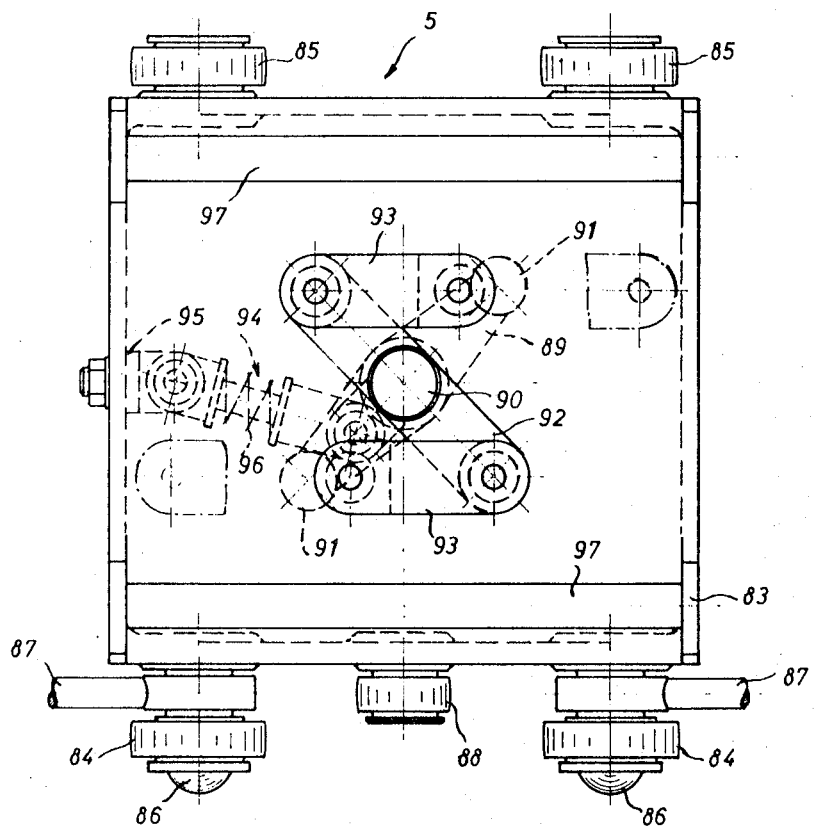
FIG. 7 is a front elevational view of a carriage forming part of the conveyor in the machine of FIG. 1 and serving as a means for transporting a neck ring.

FIGS. 7 and 8 respectively show the front and rear sides of a frame 83. Successive dollies 5 are connected to each other by aforementioned links 81 each composed of two pull rods 87 coupled to each other by a spring 98. The springs 98 compensate for eventual changes in the length of the chain of the conveyor 4.

FIG. 9 shows the upwardly extending portions or arms 120, 121 of the holder 80. The arms 120, 121 are mounted on antifriction bearings 122, 123 (see FIG. 10) provided on the guides 97. The arms 120, 121 are coupled with the motion transmitting rods 93 of the transfer lever 92 on the shaft 90, and the rods 93 move these arms toward or away from each other in dependency on movement of followers 91 which turn the control lever 89. The followers 91 receive motion from fixed cams 124 shown in FIG. 10. These cams 124 are mounted adjacent to the track 3 in regions where the sections 6, 7 of successive neck rings 8 must move toward and away from each other, see the stretch 70 of the track 3 in FIG. 2.

FIG. 10 shows that the shaft 90 is mounted in a needle bearing 125 carried by the frame 83 and that the motion transmitting rods 93 are forked so that their bifurcated ends straddle the respective arms of the transfer lever 92. The control lever 89 receives motion from the cams 124 through the intermediary of followers 91, and the shaft 90 transmits such motion to the arms 120, 121 of the holder 80 and hence to the sections 6, 7 of the neck ring 8 through the intermediary of transfer lever 92 and motion transmitting rods 93. The sections 6, 7 are suspended in the arms 120, 121 of the holder 80. FIG. 9 shows a finished bottle 126 which is carried by the neck ring 8 (only the section 7 of this neck ring is shown in FIG. 9).

Figure 26:
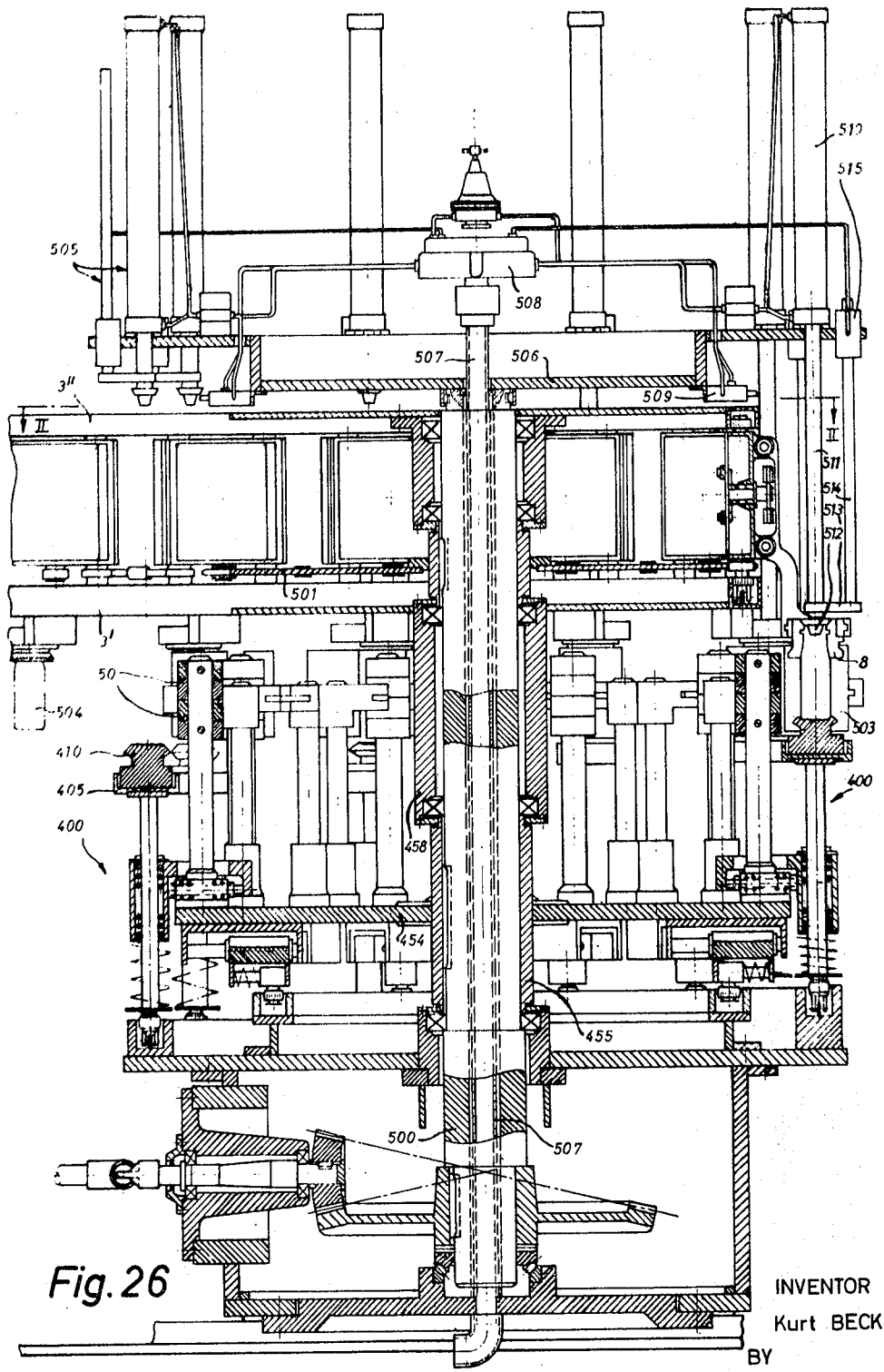
FIG. 26 is a vertical sectional view as seen in the direction of arrows from the line XXVI—XXVI of FIG. 2.

FIGS. 9 and 10 further show a portion of a sprocket wheel 127 whose teeth mesh with the rollers 88 of frames 83 and which serves to advance the chain of the conveyor 4 along the track 3. As shown in FIG. 21 a sprocket wheel 127 is coaxially mounted on the table 1 for rotation therewith. A corresponding sprocket wheel 501 also meshing with the conveyor rollers 88 is mounted coaxially on the table 2 for rotation therewith, as shown in FIG. 26. It is clear that the rollers 88 need not be installed midway between the lower roller followers 84 on the frames 83; for example, each roller 88 can be mounted coaxially with one of the roller followers 84. Furthermore, and though FIG. 9 shows one (121) of the arms 120, 121 in an operative position (corresponding to the closed position of the section 7) and the other arm (120) in inoperative position, it is clear that the arms 120, 121 move in synchronism so that the corresponding sections 6, 7 of the neck ring 8 simultaneously assume their open or closed positions.

The parts 124 and 89–96 constitute actuating means for moving the arms 120, 121 of holders 80 along the corresponding guides 97.

FIGS. 11 to 16 illustrate a portion of the chain and the sprockets in a modified endless conveyor 1004. The roller followers 84, 85 of the frames 1083 in the carriages or dollies 1005 travel in the rails 3', 3'' of the stationary track 3. Each lower roller follower 84 is provided with a bifurcated extension 170 for an auxiliary roller follower 171 which travels along the web of the lower rail 3' and transmits thereto the weight of the respective dolly. The roller followers 84 travel along the flanges of the rail 3'. The arms 172 and 173 are the neck ring holders and for this purpose have lower portions 1006 and 1007 respectively for supporting the halves of the neck ring 1008 (not shown in FIGS. 11–16, but shown in FIG. 17). The arms 172, 173 are movable toward and away from each other by actuating means including springs 174, 175 which also serve as a means for releasably fixing the arms 172, 173 in their operative and inoperative positions. The springs 174, 175 respectively comprise driven end portions or rings 176, 177 which are mounted on motion transmitting pins 178, 179 and second end portions or rings 180, 181 which are coupled to arms 172, 173. When the holder including the arms 172, 173 is in operative position (shown in FIG. 11), the ring 177 of the spring 175 is received between the rings 176, 180 of the spring 174 to thereby hold the sections 1006, 1007 of the neck ring holder in closed positions. The axis of the pin 179 is then located at the upper side of the plane which includes the axes of the rings 180, 181. This brings about a self-locking action of the springs 174, 175.

The axes of aligned roller followers 84, 85 on a frame 1083 are respectively denoted by numerals 185, 186. The dollies 1005 are articulately connected to each other by links which include pull rods 187, 188 and 189, 190. The pull rods 187, 188 have first end portions pivoted to the frames 1083 so that they can turn about the axes 185 and the first end portions of pull rods 189, 190 are also pivoted to the respective frames 1083 to rotate about the axes 186. The second end portions of pull rods 187, 188 are rotatable on a first intermediate shaft 191 and the second end portions of pull rods 189, 190 are rotatable on a second intermediate shaft 192. The shafts 191, 192 are articulately connected to each other by additional pull rods 193, 194. Spacer sleeves 195, 196 on the shafts 191, 192 are respectively inserted between the second end portions of pull rods 187, 188 and 189, 190. The parts 187–196 shown in the right-hand portion of FIG. 11 together constitute an articulate link between the dolly 1005 and the dolly (not shown) located to the right of the intermediate shaft 191. The shafts 191, 192 have upper and lower roller followers 197, 198 which respectively track the rails 3'' and 3'. The lower roller followers 198 have bifurcated extensions 199a for auxiliary rollers 199 which travel along the web of the lower rail 3'. The spacer sleeves 195, 196 perform the function of rollers 88 shown in FIG. 7 in that they cooperate with sprocket wheels which advance the conveyor 1004 along the track 3. The mounting of the parts 187–196 is such that they can compensate for relatively small changes in distances between the dollies 1005. For example, the pull rods 187–188, 189–190 and/or 193–194 may be of variable length to allow for changes in the length of respective links.

Figure 12:
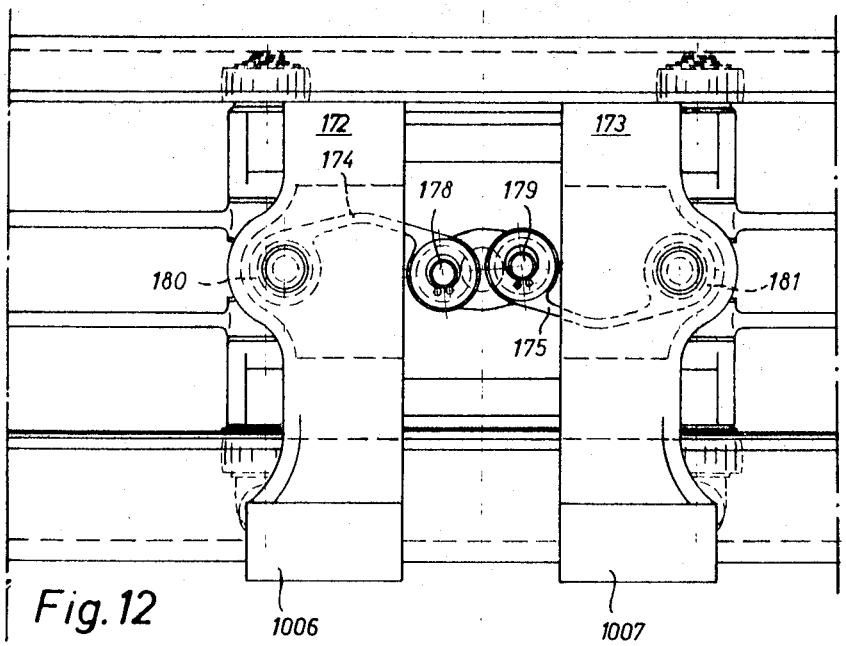
FIG. 12 illustrates the front side of a carriage in the conveyor shown in FIG. 11.

FIG. 12 shows the neck ring holder arms 172, 173 and their neck ring supporting in open positions. The springs 174, 175 are disengaged from each other and the arms 172, 173 of the holder for the sections 1006, 1007 are spaced apart. The control pins 178, 179 are shown in positions turned through slightly more than 180 degrees (in a counterclockwise direction) with reference to the positions shown in FIG. 11. The common plane of the axes of pins 178, 179 intersects and makes a small acute angle with the common plane of the axes of rings 180, 181. The yokes of the springs 174, 175 are under stress so that the arms 172, 173 are biased to their inoperative positions.

Figure 13:
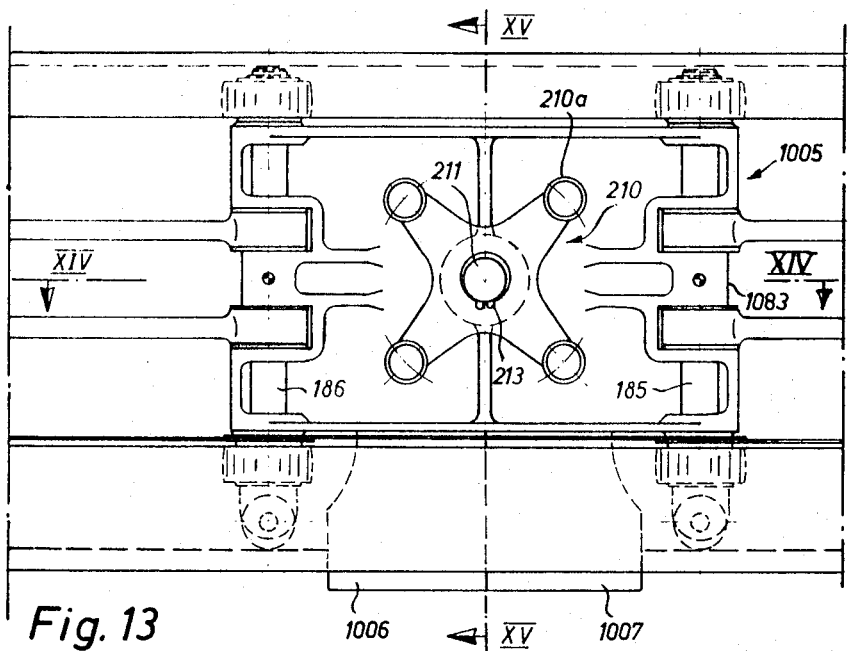
FIG. 13 illustrates the rear side of the carriage shown in FIG. 12.
Figure 15:
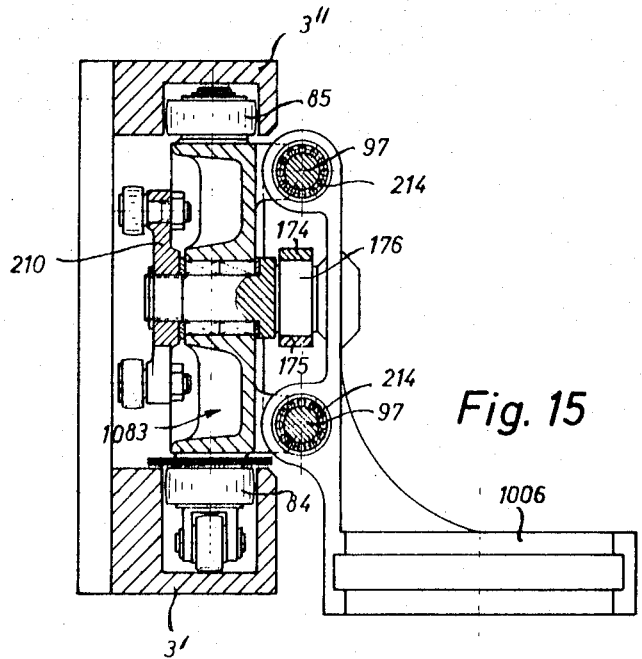
FIG. 15 is a vertical sectional view as seen in the direction of arrows from the line XV—XV of FIG. 13.
Figure 14:
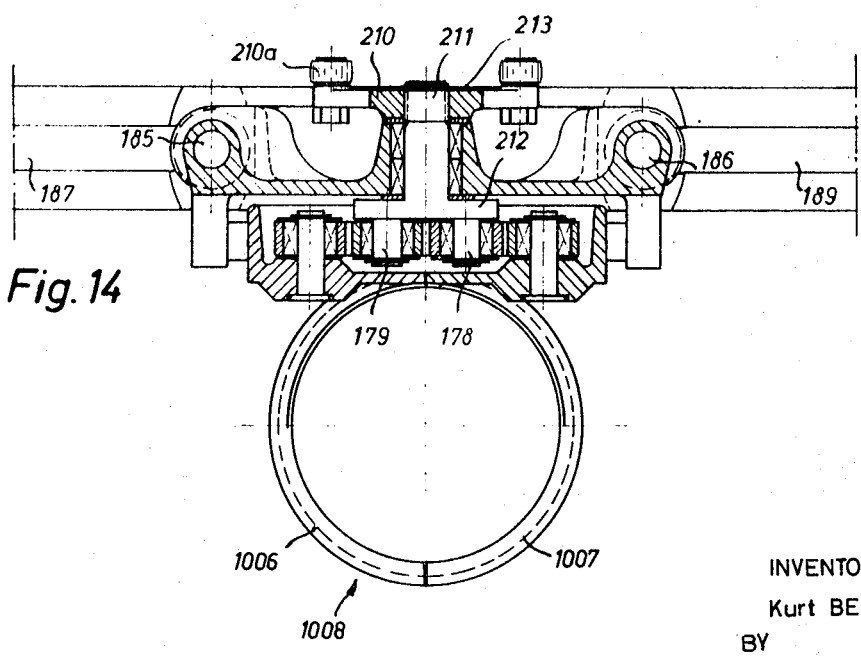
FIG. 14 is a horizontal sectional view as seen in the direction of arrows from the line XIV—XIV of FIG. 11 or 13.

FIG. 13 illustrates the rear side of a dolly 1005. The frame 1083 carries a star-shaped control member or lever 210 having four equidistant prongs and fixedly mounted on a control shaft 211. Each of the four prongs carries a roller follower 210a and the control shaft 211 is rigid with a bracket 212 which supports the aforementioned motion transmitting pins 178, 179 (see FIG. 14). The control member 210 is held against axial movement by a split ring 213. FIG. 15 shows that the arms 172, 173 are mounted on antifriction bearings 214 which surround the guides 97. This illustration further shows stiffening ribs on the frame 1083.

Figure 16:
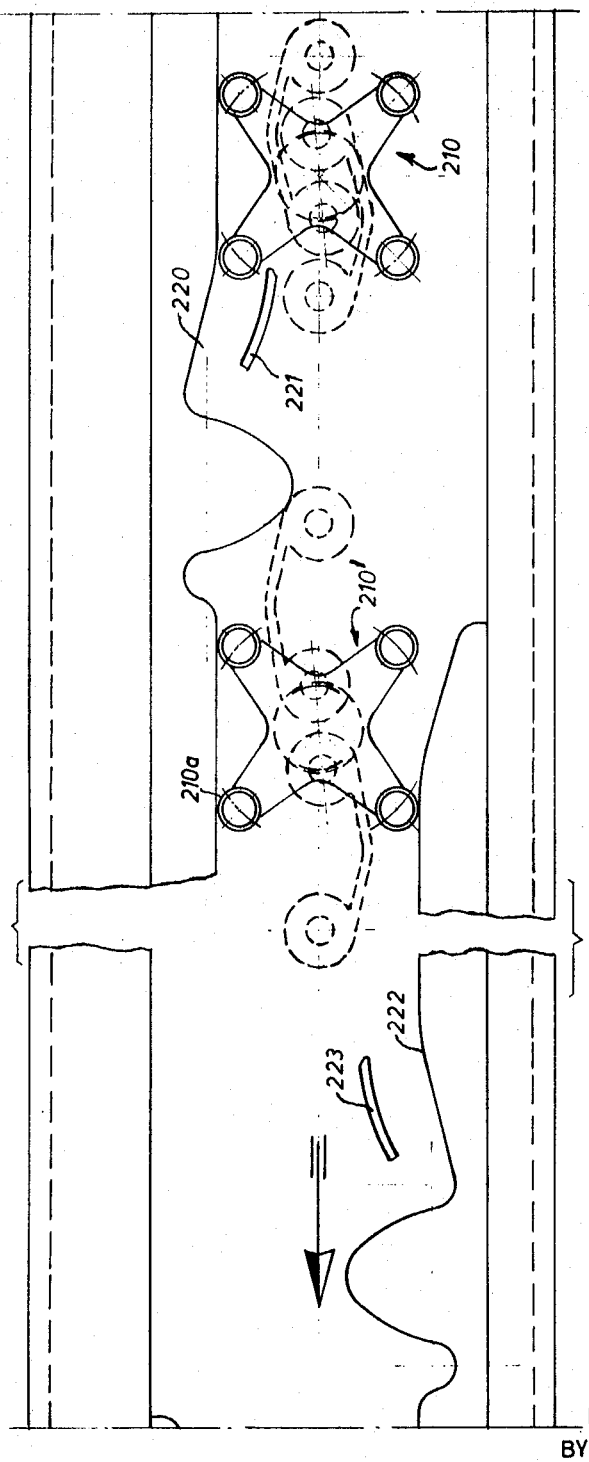
FIG. 16 is a fragmentary elevational view of a cam structure which guides and actuates certain parts of carriages in the conveyor of FIG. 11.

FIG. 16 illustrates the cams which are installed adjacent to the path of control members 210, 210' on two consecutive dollies 1005 and serve to automatically move the neck ring holder arms 172, 173 and their neck ring supporting sections 1006, 1007 between operative and inoperative positions. The cams are shown at 220, 221, 222 and 223 and they cooperate with roller followers 210a on the control members 210, 210'. The cams 220, 221 rotate the members 210, 210' in a clockwise direction to open the neck ring holder arms 172 and 173 and the cams 222, 223 rotate the members 210, 210' in a counterclockwise direction to close the neck ring holder arms 172 and 173 in automatic response to travel of dollies 1005 past the cams. These cams 220-223 are fixedly mounted adjacent to the path for the dollies 1005 and can be secured to the track 3 to effect opening and closing of neck rings 1008 along certain selected stretches of the track.

The drive for the chain of the conveyor 4 or 1004 can derive motion from the drive for one or both of the tables 1 and 2. For example, the sprocket wheel 127 of FIGS. 9-10 or the sprocket wheel which drives the sleeves 195, 196 of FIG. 11 can be mounted on the table 1 to receive torque from a variable-speed transmission which rotates such table. Alternatively, and as mentioned hereinbefore, each sprocket wheel and each auxiliary assembly can be driven by a separate transmission, and such transmissions can be driven by a common prime mover or by separate motors. A common prime mover is normally preferred because the chain of the conveyor 4 or 1004 is subjected to lesser tensional stresses if all sprocket wheels of the conveyor are positively driven. The drive means for the conveyor, tables 1, 2 and auxiliary assembly or assemblies may comprise a synchro drive, also called electric shaft.

Figure 17:
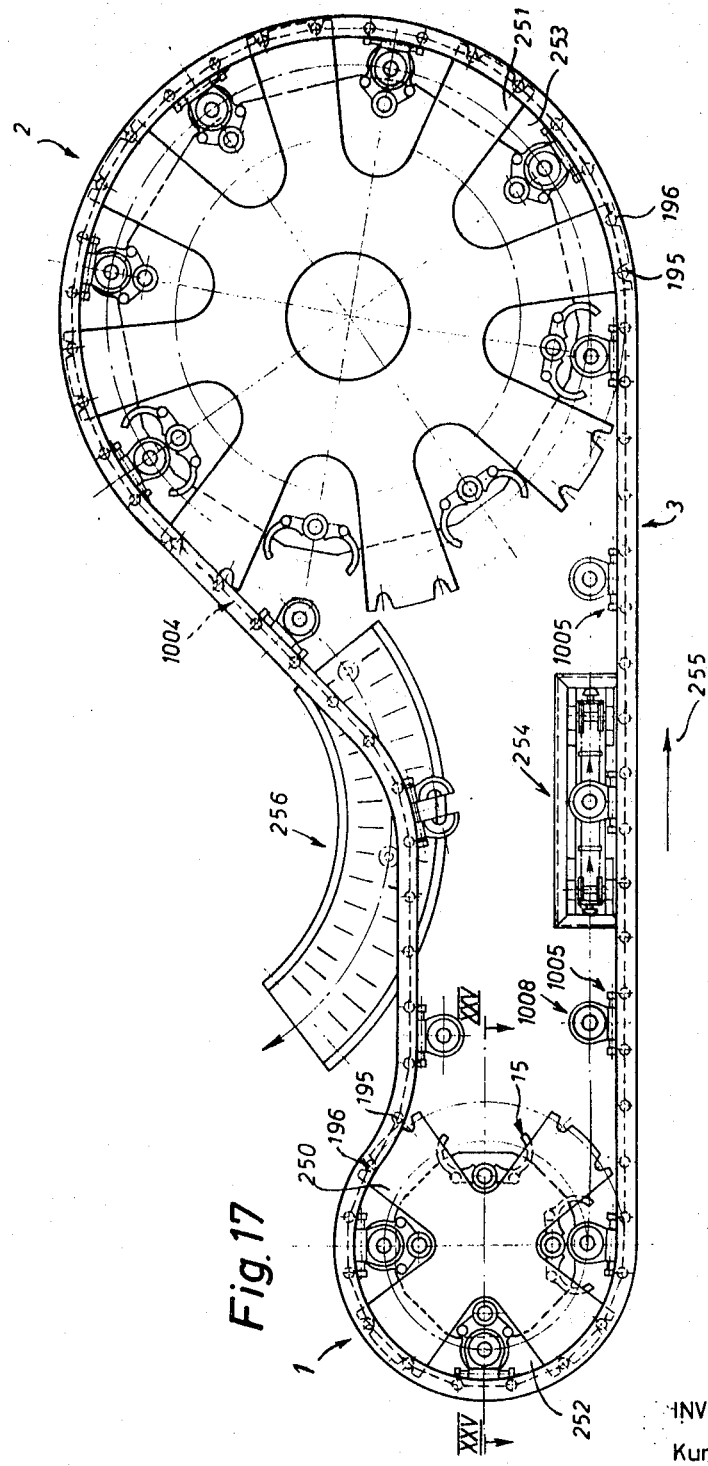
FIG. 17 is a schematic top plan view of a modified machine wherein the neck rings extend inwardly from the chain of an endless conveyor of the type shown in FIG. 11, certain parts of the machine being shown in horizontal section substantially as seen in the direction of arrows from the line XVII—XVII of FIG. 25.

FIG. 17 shows a modified bottle making machine wherein the dollies 1005 travel along the track 3 in the same way as in the machine of FIG. 1. However, the neck rings 1008 travel in the space within the confines of the track 3, i.e., they extend inwardly of the chain of the conveyor 1004. The sprocket wheels 250, 251 which are respectively coaxial and driven with tables 1 and 2 are provided with cutouts or tooth spaces 252, 253. The teeth of these sprocket wheels engage the sleeves 195, 196 on the intermediate shafts 191, 192 of the chain of the conveyor 1004. The blank molds of the machine shown in FIG. 17 need not move radially of the table 1 as will be described later in connection with FIG. 25. The parisons which are held by neck rings 1008 and travel away from the table 1 move past a blowing assembly 254 which corresponds to the blowing assembly 100 of FIG. 6 and is located in the area surrounded by the chain of the conveyor 1004. The direction in which the neck rings 1008 travel is indicated by the arrow 255. After leaving the station which accommodates the table 2, finished bottles travel toward a transfer station 256 and are thereupon transported by a lehr conveyor to a cooling station. The neck rings 1008 are opened and closed by cams corresponding to cams 220-223 shown in FIG. 16.

Since the neck rings 1008 are located within the confines of the endless chain which includes the dollies 1005, they travel at a speed which is less than the speed of the dollies. This is desirable because the parisons and finished bottles are subjected to lesser centrifugal forces during travel around the tables 1 and 2. Moreover, the dollies 1005 can be made smaller than dollies 5 and can be placed nearer to each other. Also, and since the blank molds on the table 1 need not move radially outwardly, the construction of gob feed is simpler than in a machine of the type shown in FIG. 2.

Figure 18:
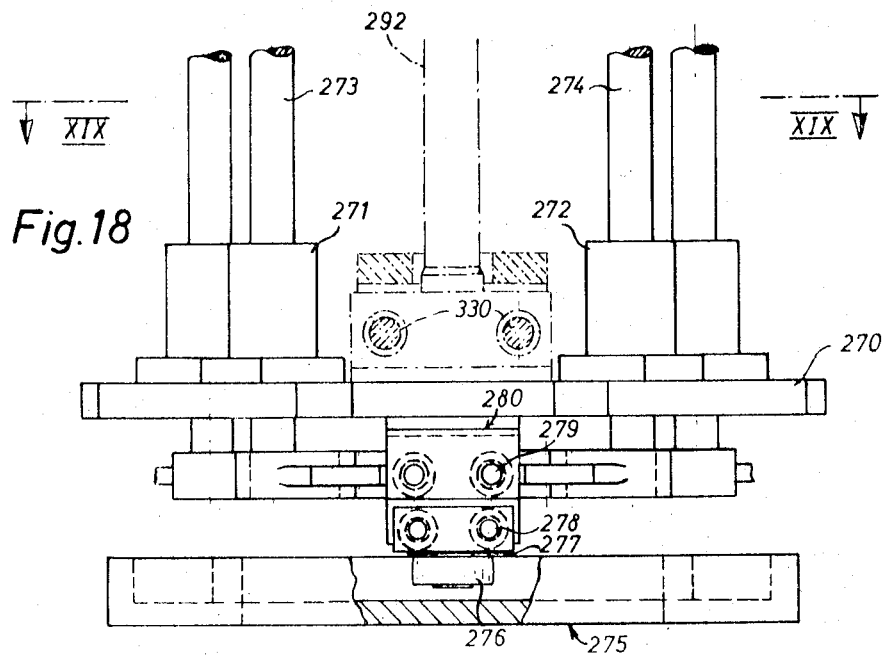
FIG. 18 is an enlarged fragmentary vertical sectional view of the machine shown in FIG. 21 and illustrates the means for operating the tongs at one of the tables, the section being taken in the direction of arrows as seen from the line XVIII—XVIII of FIG. 19.
Figure 19:
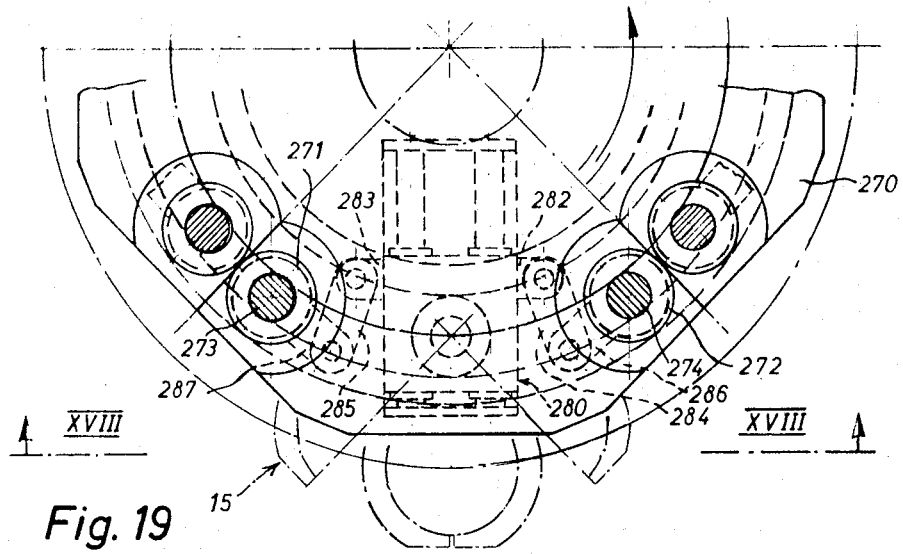
FIG. 19 is a horizontal sectional view as seen in the direction of arrows from the line XIX—XIX of FIG. 18.
Figure 20:
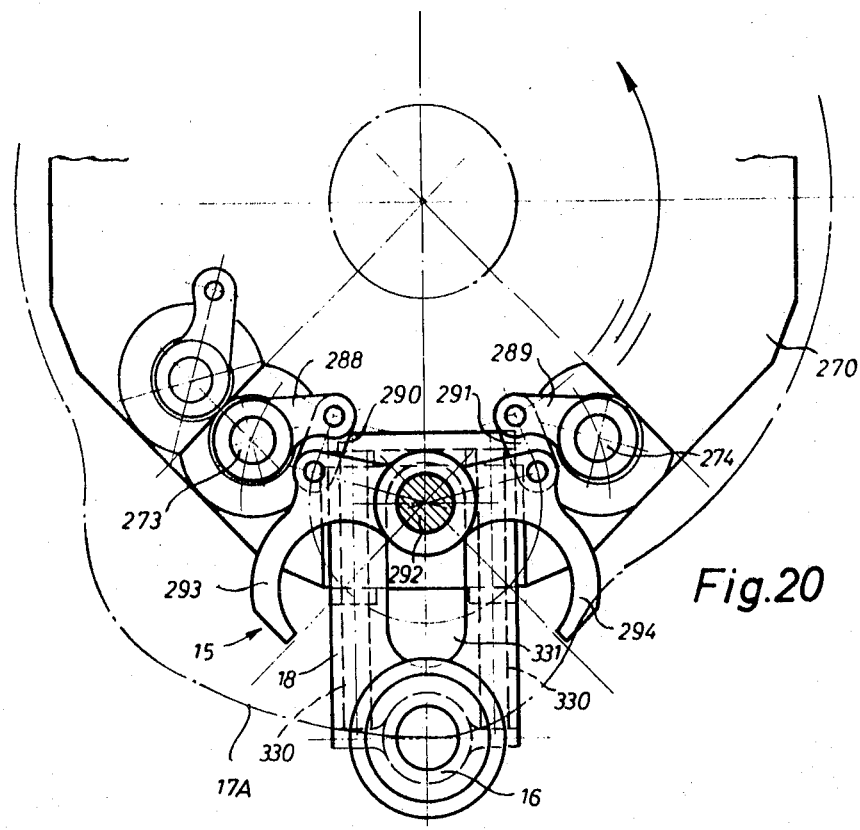
FIG. 20 is an enlarged horizontal sectional view as seen in the direction of arrows from the line XX—XX of FIG. 21.

FIGS. 18-20 show the manner in which the gripper means tongs 15 are controlled. The tongs 50 are controlled in a similar way. FIG. 18 illustrates a baseplate 270 which carries two bearing sleeves 271, 272 for each of the tongs 15. These sleeves support drive shafts 273, 274 which receive motion from a roller follower 276 cooperating with a cam 275. The follower 276 is mounted in a first slide 277 which is slidable along ways 278 rigid with a second slide 277 which is slidable along ways 278 rigid with a second slide 280 which can travel along ways 279. Springs 281 (shown in FIG. 21) are interposed between each first slide 277 and the associated second slide 280. The springs 281 tend to move the tongs 15 to closed positions.

FIG. 19 shows that each second slide 280 comprises two lateral projections 282, 283 coupled to levers 286, 287 by links 284, 285. The levers 284, 285 are rigid with drive shafts 273, 274 which extend upwardly beyond the bearing sleeves 271, 272 and carry levers 288, 289 (FIG. 20) serving to move links 290, 291 which are coupled with the sections or halves 293, 294 of the respective tongs 15. These sections 293, 294 are turnable, not unlike the leaves of a hinge, on an upright column or pintle 292.

For better visualization of movements of sections 292, 293, FIG. 19 shows one of the tongs 15 in fully open position and also in closed position. FIG. 20 shows the manner in which a blank mold 16 can move radially and away from the axis of the table 1 when it reaches the filling station 17. The blank mold 16 follows ways 17A and is mounted on a platform 18 which is mounted on two ball bearings 330 (FIG. 18). The platform 18 has a cutout 331 located between the respective bearings 330 and accommodating the pintle 292. The drive which moves the blanks 16 along the ways 17A will be described in connection with FIG. 23.

The springs 281 insure that the sections 293, 294 of tongs 15 cannot be damaged if a foreign object happens to penetrate between such sections. Moreover, the springs 281 insure that the sections of tongs 15 are biased to closed positions independently of the configuration and condition of the ways 17A. Still further, the springs 281 compensate for eventual play between the components of the means which transmits motion to the sections of tongs 15 during movements of such sections about the axes of pintles 292.

Referring to FIG. 21, there is shown the structure at the station which accommodates the table 1. A rigid bottom 350 is suspended in a baseplate 351 of a transmission casing 352. The bottom 350 supports a roller bearing 353 whose inner race surrounds a hollow upright shaft 355 which is driven by a bevel gear 354 meshing with a bevel gear 356 on a driven input shaft 357. The shaft 355 is further mounted in a radial bearing 358 whose outer race is mounted in the casing 352. The input shaft 357 is also journaled in the casing 352. The inner race of the radial bearing 358 carries a hub 359 which is driven by the shaft 355. The hub 359 supports the baseplate 270 (FIG. 18) which carries the tongs 15 and the moving means therefor as well as the platforms 18 for the blank molds 16. These blank molds 16 are carried by shock absorbing struts 400 (FIG. 24) which are mounted on platforms 18 and bear against a cam 401 on the top wall 360 of the casing 352.

FIG. 21 shows that the upper end of the hub 359 supports the inner race of a roller bearing 361 whose outer race carries a fixed supporting pipe 362 for the lower rail 3' of the track 3. The upper portion of the pipe 362 is rigid with the outer race of a roller bearing 363 whose inner race surrounds a hub 364 for the sprocket wheel 127 (see also FIGS. 9 and 10). The hub 364 is driven by the hollow shaft 355. The upper portion of the hub 364 supports the inner race of a further roller bearing 365. The outer race of the bearing 365 is rigid with a fixed supporting tube 366 for the upper rail 3″ of the track 3. The upper end of the tube 366 is centered by a radial bearing 367.

When the distance between the stations which accommodate the tables 1 and 2 is changed, e.g., when such distance is increased by moving the table 2 away from the table 1, the track 3 must be lengthened by insertion of sections. The abutting ends of the sections of rails 3′ and 3″ are connected to each other by releasable couplings 368.

As shown in FIG. 22, the hollow shaft 355 extends upwardly and beyond the upper rail 3″ of the track 3. The upper end of this shaft carries a plate 369 which is keyed thereto and has a central opening 370 for a stationary supply conduit 371 which admits a pressure medium. The conduit 371 extends downwardly through the entire shaft 355 and is affixed to the bottom 350 of the casing 352. This conduit conveys compressed gas (preferably air) and is connected to a threaded nipple 372 (FIG. 22) which admits compressed gas to a rotary distributor 374. The latter serves to admit compressed gas to cylinders 377, 378 for plungers or rams 375 and for movable parts 376 of the feed for molten glass. A suitable gasket 373 prevents leakage of gas where the nipple 372 communicates with the distributor 374. The cylinders 377, 378 are mounted on a rotating plate 369 at the upper end of the shaft 355. This plate further supports radially movable delivery funnels 380 whose tubes or lower parts 376 can be pivoted upwardly to avoid collision with the track 3. Radial movements of delivery tubes 380 are controlled by a cam 381; such radial movements are necessary because the struts 400 move the blanks molds 16 radially outwardly prior to filling of such blank molds with molten glass. The feed for molten glass further comprises a source 385 of molten glass whose outlet is disposed above gob shears 386. The batches or gobs 387 are discharged into the upper ends of delivery tubes 380 after the upper ends move radially inwardly. If a mold 16 should not receive a gob 387, the lower part 376 of the respective delivery tube 380 is moved slightly radially outwardly to register with the receiving end of a collecting pipe 388 shown in FIG. 21 by broken lines.

FIG. 23 illustrates a portion of the just described structure in greater detail. The baseplate 270 for the tongs 15 is rigid with the hub 359 and carries the ball bearings 330 to guide the platforms 18 for the blank molds 16. The platforms 18 carry the struts 400 which are provided with roller followers 402 for the cam 401. The latter has a cam groove which receives the followers 402 with a small clearance and causes radial movements of struts 400 when such struts travel about the axis of the shaft 355. Axial movements of struts 400 are controlled by roller followers 403 which are mounted in bifurcated brackets 404 extending downwardly from roller followers 402 (see FIG. 24). The followers 403 engage the bottom surface in the groove of the cam 401. The followers can be replaced by balls.

The upper end of each strut 400 carries a cup or container 405 which floatingly supports a blank mold 16 with the interposition of a ring-shaped spring 406. Such mounting of blank molds 16 is desirable to compensate for inaccuracies in guidance when the blank molds enter and leave various stations in the bottle making machine. Furthermore, the component parts of blank molds 16 must be grasped by tongs 15, and such component parts can be centered with greater facility if the blank molds are movable with reference to the cups 405.

FIG. 23 shows a portion of the fixed supporting pipe 362 which extends upwardly from the hub 359 and surrounds with clearance the hollow shaft 355. The fixed supply conduit 371 extends with clearance through the shaft 355.

The baseplate 270 supports the pintles 292 which transmit motion to the sections of tongs 15 in a manner as described in connection with FIGS. 18–20. FIG. 23a shows one of the pintles 292 in horizontal section and further shows the ring-shaped spring 406 between one of the cups 405 and the corresponding blank mold 16. The spring 406 is coiled and is inserted in prestressed condition to center the respective blank mold 16.

Figure 24:
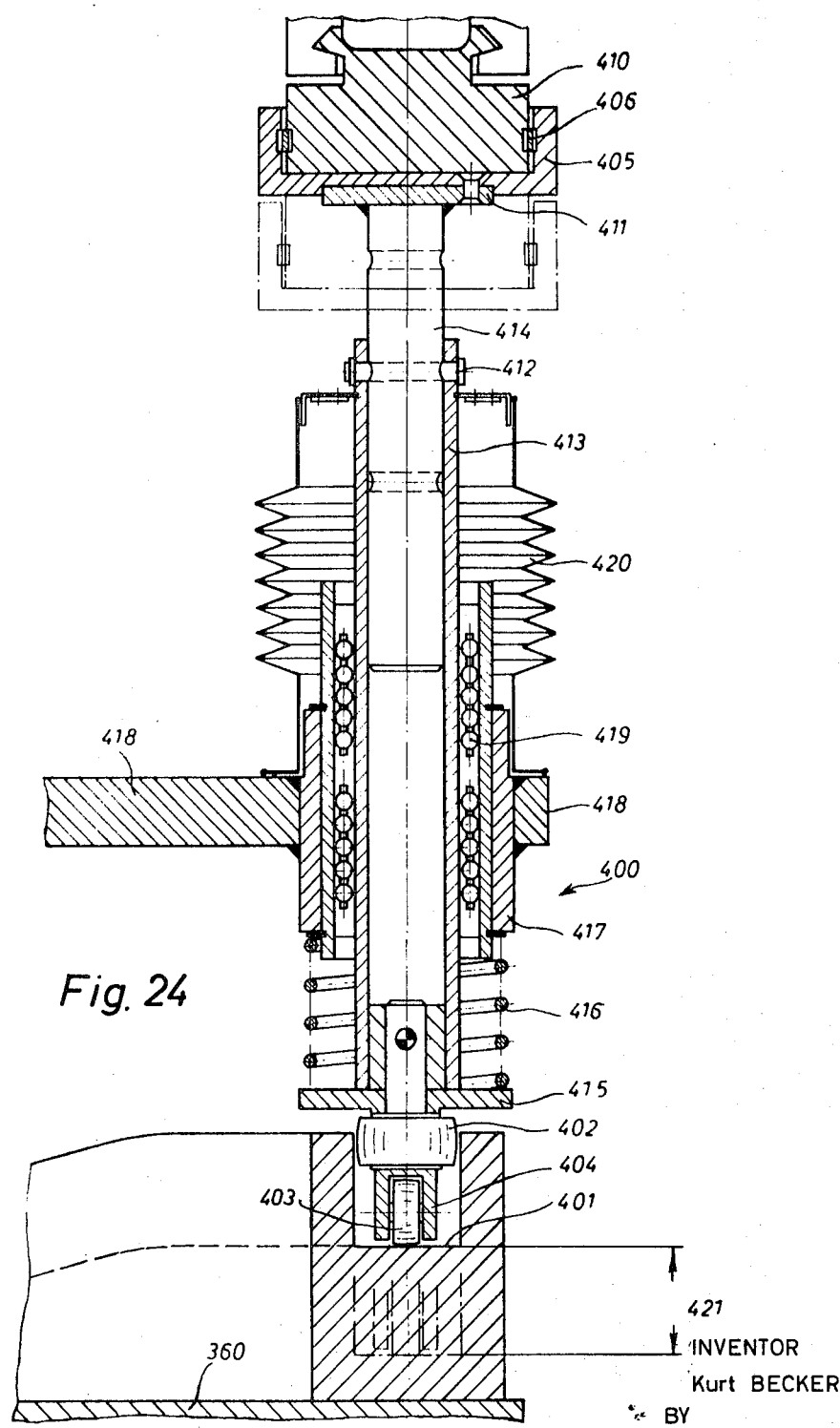
FIG. 24 is an axial sectional view of a strut.

FIG. 24 shows that the cup 405 is removably secured to a foot 411. The numeral 410 denotes the bottom wall of a blow mold. The foot 411 is secured to the upper end of a post 414 which is guided in a supporting tube 413 and is vertically adjustably coupled to this tube by a pin 412. The lower end of the tube 413 rests on a disk 415 which carries the aforementioned roller followers 402, 403 and bracket 404. A helical spring 416 bears against the disk 415 and its uppermost convolution supports a sleeve 417 secured to a radial guide 418 forming part of the platform 18. Ball bearings 419 are interposed between the sleeve 417 and tube 413. A bellows 420 shields the strut 400 against entry of dust; this bellows is installed between the guide 418 and tube 413 and its principal purpose is to protect the bearings 419.

The stroke 421 of the strut 400 is indicated in the lower part of FIG. 24.

Figure 25:
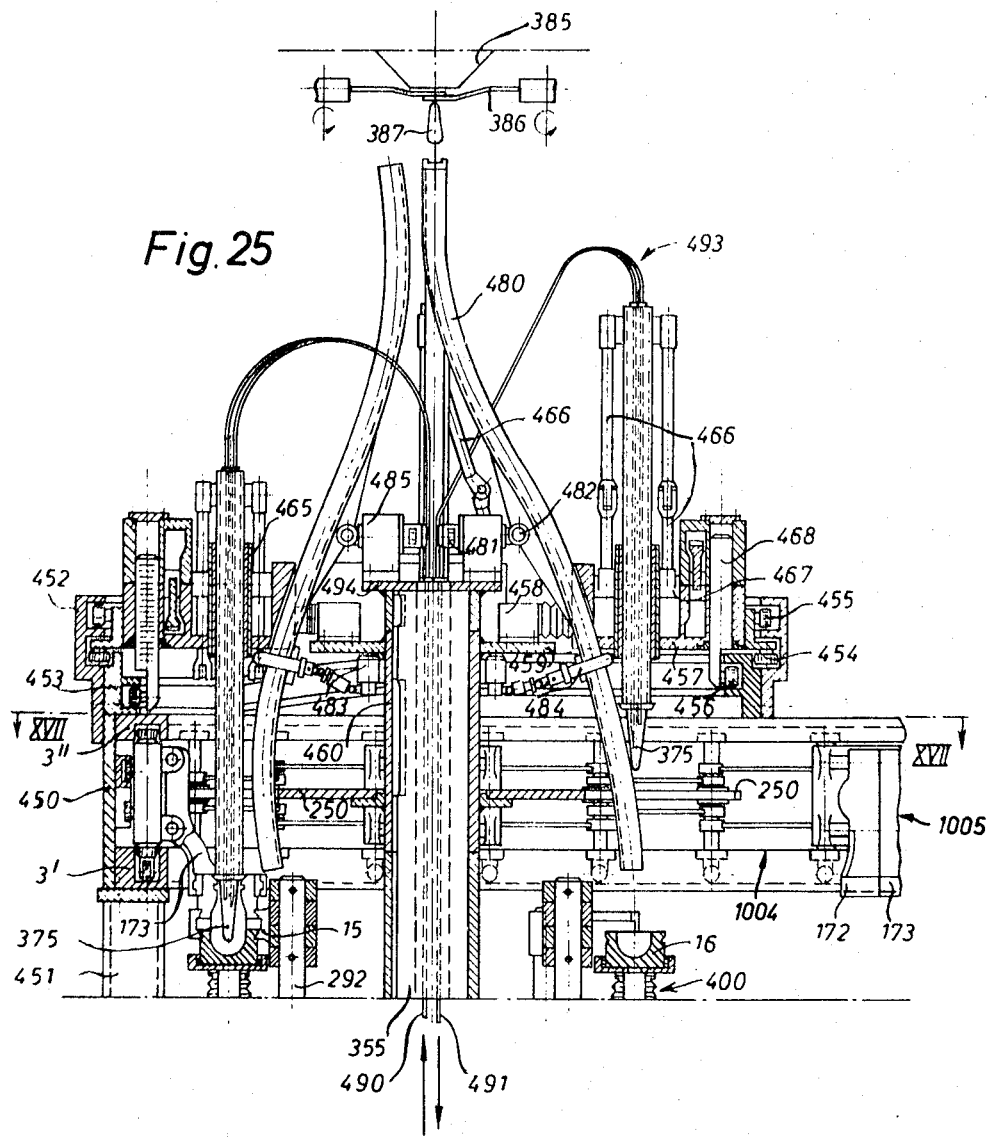
FIG. 25 is a vertical sectional view of the station which accommodates the blow molds, the section being taken in the direction of arrows as seen from the line XXV—XXV of FIG. 17.

FIG. 25 illustrates a modification of the structure shown in the upper part of FIG. 21. This embodiment of my invention utilizes dollies 1005 of the type shown in FIG. 11 but with the neck ring holder arms 172, 173 disposed on the inner side of the conveyor so as to support the neck rings 1008 on the inner side of the conveyor loop as illustrated in FIG. 17. The blank molds 16 rest on struts 400 but need not move radially outwardly in order to be properly located for reception of molten glass. However, a relatively small radial displacement of struts 400 is desirable in order to insure that the tongs 15 can close at the point where the centers of neck rings 1008 enter the station accommodating the table 1 and that the tongs 15 open at the point where the neck rings 1008 leave such station. In the region of such points, the portions of chain of the conveyor 1004 move the neck rings 1008 radially but to a small extent so that it suffices to move the struts 400 in a manner to be described in connection with FIG. 27.

In FIG. 25, the rails 3′ and 3″ are connected with a rigid plate 450 which is supported by a column 451. The upper end of the plate 450 carries profiled members 452, 453 for cams 454, 455 and 456 which control radial and axial movement of plungers 375. The cam 455 supports several frames 457 each of which accommodates the guide and drive means for a plunger 375. The inner portion of each frame 457 is mounted in a bearing block 458. The frames 457 are movable on blocks 458 radially of the hollow shaft 355 and are guided by the cam 454. The blocks 458 are mounted on a disk 459 which is rigid with a hub 460 keyed to the shaft 355. The hub 460 drives a sprocket wheel 250.

Each plunger 375 is movable axially in a bearing sleeve 465 mounted in the respective frame 457. The plungers are moved axially by pairs of crank drives 466 which receive motion from a crank shaft 467 rotated by a rack 468. The latter is moved by the cam 456. Thus, the crank drives 466 for the plungers 375 are operated in automatic response to rotation of the table 1. Radial movements of plungers 375 are necessary only when required owing to the design and mounting of the chain of the conveyor 1004.

The structure of FIG. 25 again comprises a source 385 of molten glass with a single outlet. Gobs 387 are formed by shears 386 and are caused to drop into one-piece delivery tubes 480. The median portion of each delivery tubes 480 are articulately connected (as at 482) to axially movable shafts 481. Furthermore, each funnel 480 is engaged by a support 484 which is connected with a servomotor 483 by means of a universal joint. By operating the motors 483 and shafts 481 simultaneously or independently of each other, the delivery tubes 480 can be moved into registry with the outlet of the source 385 and above the blank mold 16 as well as beyond the outlet and out of the way of the plungers 375.

In this embodiment of my machine, the hollow shaft 355 accommodates only conduits 490, 491 for a cooling medium which cools the plungers 375. These conduits extend to the upper end of the shaft 355 and are connected to a distributor (not shown) which delivers cooling medium to conduits 493 connected to individual plungers 375. The conduits 490, 491 extend through an opening provided in a rotating cover plate 494 which supports servomotors 485 serving to move the aforementioned shafts 481.

FIG. 26 is an axial sectional view of the station which accommodates the table 2. This station also includes a hollow vertical shaft 500 and many components at this station are similar to those shown in FIG. 21. The tongs 50 are constructed in the same way as the tongs 15, and the same applies for the struts 400 and for the mounting of rails 3' and 3" and the mounting of and drive for the sprocket wheel 501 and shaft 500. The cups 405 carry bottom walls 410 of blow 503 molds and such bottom walls 410 can be lifted by struts 400 with reference to the upper portions of blow molds 503 to be centered together with the neck rings 8.

The station of FIG. 26 serves to complete the transformation of parisons 107 or 34 into finished bottles 504. Such parisons might undergo preliminary treatment at the station of FIGS. 2–5 or FIG. 6. The blowing heads 505 which cooperate with the blow molds 503 are mounted on a turntable 506 which is rotatable with the shaft 500. This turntable is traversed by a conduit 507 which supplies compressed air and extends through the entire shaft 500. One end of this conduit 507 is secured to the frame structure at the station of FIG. 26 and its upper end is connected to a distributor 508 which supplies compressed gas to individual blowing heads 505 through the intermediary of regulating valves 509 which open and close at predetermined intervals in response to rotation of the turntable 506.

Each blowing head 505 comprises a cylinder 510 and a piston rod 511 whose lower end carries a blowing nozzle 512 which receives compressed air through a bore of the piston rod 511, a yoke 513, a pipe 514 and a guide member 515 which latter is mounted on the turntable 506. The pipe 514 is slidable in the guide member 515 and can admit compressed air to yoke 513 and nozzle 512 only in a predetermined axial position.

As already explained in connection with FIG. 25, the blank molds 16 need not move radially outwardly in order to receive molten glass from the gob feed. However, and if the design of the conveyor renders it necessary, the struts 400 must be displaced radially to a small extent. Accordingly, since the mold supporting platform 18 are slidable along the ball bearings 330 at both tables 1 and 2, they can perform relatively short radial strokes.

Figure 27:
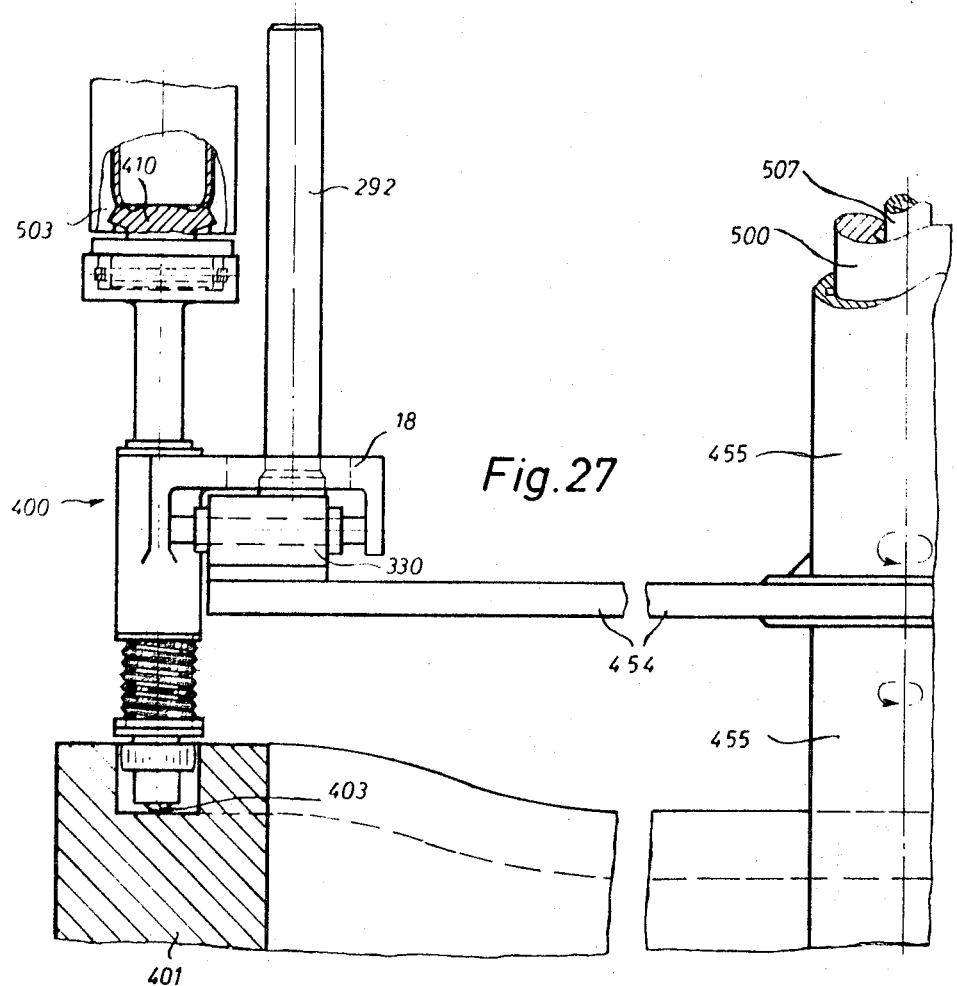
FIG. 27 is a side elevational view of a modified strut.

The strut 400 of FIG. 27 moves the bottom wall 410 of the blow mold 503 vertically with reference to the upper portion of the blow mold and is supported by a cam 401 through the intermediary of a spherical follower 403. The mounting of the shaft 500 and conduit 507 therein is the same as shown in FIG. 26.

Figure 28:
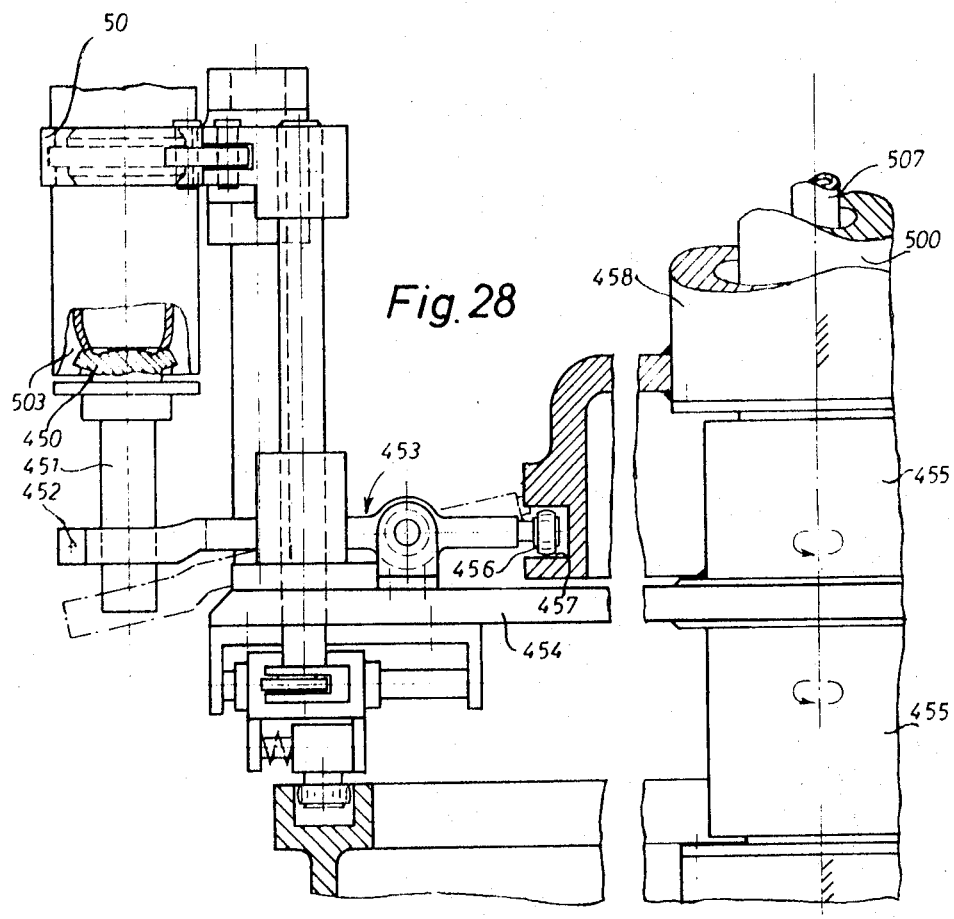
FIG. 28 is a partly elevational and partly sectional view of a detail in the structure of FIG. 26.

FIG. 28 illustrates certain details of a structure constituting a modification of that shown in FIG. 27. The bottom wall 450 of the blow mold is mounted on a rod 451 which is adjustable vertically and can be fixed in selected axial position by a clamping device 452 which is mounted on one arm of a lever 453. The adjustability of the rod 451 renders it possible to use the bottom wall 450 in blow molds of different height. The lever 453 is rockable on a plate or support 454 which is secured to a hub 455 on the hollow shaft 500. The hub 455 corresponds to the hub 359 shown in FIG. 21. The other arm of the lever 453 carries a roller 456 which tracks the face of a cam 457. The latter is affixed to a stationary supporting tube 458. The struts 400 are normally preferred over the structure shown in FIG. 28 because they occupy less room and their movements can be controlled and effected in a simpler way.

Figure 29:
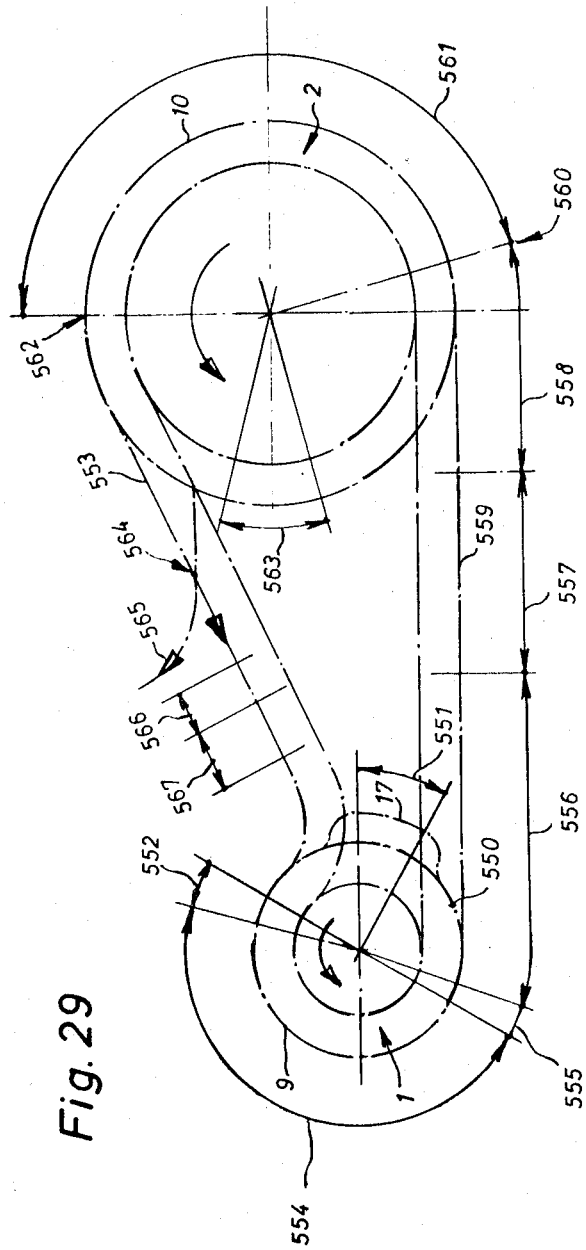
FIG. 29 is a diagram showing various stages in the production of containers by resorting to machines of the type shown in FIGS. 1–28.

The operation of my bottle making machine will be described with reference to the diagram of FIG. 29. The directions in which the tables 1, 2 rotate are indicated by arrows. The circles 9, 10 indicate the arcuate paths in which the centers of neck rings 8 travel about the axes of the tables 1 and 2.

While traveling along the stretch 550 of their circular path, the blank molds 16 move upwardly to enter the filling station 17. Along the stretch 551, the blank molds 16 are lubricated by suitable lubricating means and receive gobs 387 from funnels 380. The tongs 15 are held in open positions. The numeral 552 denotes that stretch of the path defined by the track 3 where a neck ring 8, coming from the stretch 553, enters the path 9 and is moved into substantial registry with a lubricated and charged blank mold 16. The tongs 15 closes and centers the blank mold 16 with reference to the adjoining neck ring 8 by way of the halves 16a of the center part of the blank mold. The plunger 375 moves downwardly to penetrate into the blank mold 16 and to start the shaping of the gob. Such deformation continues while the blank mold 16 travels along the stretch 554 of the path 9.

While travelling along the stretch 555, the tongs 15 opens and the blank mold 16 is lowered by the strut 400 but the neck ring 8 remains closed and holds the top portion of the parison 107 (FIG. 6). The reheating of parison 107 begins and continues while the neck ring 8 advances along the stretch 556. In the stretch 557, the parison undergoes preliminary blowing treatment in a manner as described in connection with FIG. 6 or FIGS. 3–5. The reheating continues while the partially finished article travels along the stretch 558 and the duration of reheating can be varied by changing the distance between the tables 1 and 2, i.e., by changing the length of the stretch 559 along which the neck rings 8 advance from the path 9 to the path 10. The speed of the conveyor 4 is preferably constant.

At the point 560, the bottom wall 450 or 410 of the blow mold is swung upwardly (FIG. 28) or moves vertically upwardly (FIG. 26) and a neck ring 8 moves into substantial registry with the raised bottom wall 450 or 410. The parison is suspended in such neck ring 8 and the tongs 50 (which carries the upper portion of a blow mold 503) engages the neck ring and the respective blow mold to center it exactly with reference to the neck ring and to clamp the neck ring, the portion 503 and the bottom wall 450 or 410. The blowing head 505 moves downwardly and the final blowing begins. Such blowing continues along the stretch 561. At the point 562, the tongs 50 opens to release the finished bottle but the latter remains suspended in the associated neck ring 8. The bottom wall 450 or 410 swings or moves downwardly and away from the bottle.

The blow mold 503 is lubricated during travel along the stretch 563 of the path 10. The neck ring 8 opens along the stretch 564 and delivers the finished bottle to a lehr conveyor 565. The neck ring 8 is thereupon lubricated along the stretch 566 and closes again along the stretch 567 prior to entering the path 9.

Since the plungers 375 share rotary movements of the blank molds 16, they can treat the plasticized material along an elongated stretch (554) of the path (circle 9) in which the blank molds travel about the axis of the table 1. Therefore, the conveyor 4 or 1004 can be driven at a high speed without unduly reducing the intervals during which the plungers are active. As described hereinbefore, the plungers 375 can be operated by cam means to move radially of the table 1 in order to compensate for radial movements of transporting means 8 or 1008 during travel around the table 1. Axial movements of plungers 375 are effected by crank drives shown in FIG. 25. Such mechanical drives are preferred at high rotational speeds of the tables.

The funnels of the gob feed rotate with the table 1. The lower end portions of such funnels are movable up and down to avoid collision with the sections of the track 3 if the neck rings extend outwardly from the chain of the conveyor 4 or 1004. If the neck rings extend inwardly, only the upper ends of funnels must be guided to move them serially into registry with the single outlet of the source 385. This has been described in connection with FIG. 25.

Of course, the operation of various components of my machine need not be exactly the same as described in connection with FIG. 29. Thus, the various stretches of paths for the traveling components can be shorter or longer, depending on the nature of such components and their actuating means. It is immaterial, however, whether the beck rings 8 or 1008 extend inwardly or outwardly from the chain of the conveyor 4 or 1004.

In the preceding detailed description of my invention and in the appended claims, the term "bottle" is intended to embrace all types of containers or like hollow articles.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a press and blow machine for the production of bottles and like hollow articles from vitreous material, a combination comprising,
 a. a first turntable rotatable about a vertical axis;
 b. a second turntable rotatable about a vertical axis and spaced from said first turntable;
 c. endless conveyor means extending between and encircling respectively a portion of said turntables for movement in synchronism with said turntables;
 d. a plurality of spaced blank mold means carried by said first turntable;
 e. a plurality of spaced blow mold means carried by said second turntable;
 f. a plurality of neck rings carried by said conveyor means and spaced therealong so that during movement of said conveyor means and turntables, each neck ring is brought into axial alignment with and becomes part of a blank mold means as it moves about the encircled portion of said first turntable, and is brought into axial alignment with and becomes part of a blow mold means as it moves about the encircled portion of said second turntable;
 g. means for feeding a gob of vitreous material from above into each of said blank mold means;
 h. plunger means carried by said first turntable for rotation therewith about the axis of said table and axially extendable into each blank mold means while the blank mold means is on said encircled portion of said first turntable, for converting the gob in said blank mold means into a parison with the upper end of the parison being held by the associated neck ring, each neck ring with a parison held thereby being carried by said conveyor means to said second turntable so that the neck ring is brought into registry with a blow mold means as it moves about the encircled portion of said second turntable; and
 i. blow head means carried by said second turntable for rotation therewith about the axis of said second turntable and being movable into operative position over each blow mold while the blow mold means is on said encircled portion of said second turntable, for blowing a parison supported in said blow mold means by a neck ring into a hollow article.

2. A combination as defined in claim 1 wherein said plunger means comprises a plurality of plungers, one for each blank mold means, carried by said first turntable, and wherein said blowing head means comprise a plurality of blowing heads, one for each blow mold means, carried by said second turntable.

3. A combination as defined in claim 1, wherein said conveyor means comprises a chain including a series of carriages for said neck rings and links connecting said carriages to each other.

4. A combination as defined in claim 3 and including a pair of vertically spaced guide rails of U-shaped cross section for guiding said carriages at least in the region wherein said conveyor means extend about said turntables, each of said carriages having four rollers extending with clearance into the respective rails and an auxiliary follower means extending into and tracking the lower of said rails.

5. A combination as defined in claim 3, wherein each of said carriages comprises a frame, at least one guide provided on said frame, holder means having two portions movable along said guide, and actuating means for moving said portions of said holder means, each of said neck rings comprising two sections respectively connected to said two portions of said holder means.

6. A combination as defined in claim 5, wherein said portions of each of said holder means are movable between first and second positions to thereby move the sections of the respective neck rings between closed and open positions, said actuating means comprising control means arranged to move said portions of said holder means into and to yieldably retain such portions in said first and second positions.

7. A combination as defined in claim 6, wherein said actuating means further comprises stationary cam means having portions adjacent to said chain to engage said control means during travel of the respective carriages past said cam means.

8. A combination as defined in claim 7, wherein each of said control means comprises a control lever rockably supported by the frame of the respective carriage and having follower means tracking said cam means, said actuating means further comprising detent means connected with said control levers to yieldably maintain the latter in one of two positions corresponding to the open and closed positions of the respective transporting means, a transfer lever rigid with each control lever, and motion transmitting members connecting said transfer levers with the portions of the respective holder means.

9. A combination as defined in claim 7, wherein each of said control means comprises a control lever rotatable on the respective frame and having followers tracking said cam means to move said lever back and forth, said actuating means further comprising a pair of motion transmitting members movable with each of said control levers and springs coupling said motion transmitting members with said portions of the respective holder means.

10. A combination as defined in claim 9, wherein each of said springs has two enlarged end portions and wherein one end portion of one of said springs extends between the end portions of the other spring in one position of the respective sections.

11. A combination as defined in claim 3, wherein said chain comprises elastic links interposed between said carriages.

12. A combination as defined in claim 11, wherein each of said links comprises a pair of pull rods each connected with one of the adjoining carriages and spring means coupling said pull rods to each other.

13. A combination as defined in claim 3, wherein each of said links comprising at least one intermediate shaft and pull rods connecting said intermediate shaft to adjoining carriages.

14. A combination as defined in claim 13, wherein each of said links comprises two parallel intermediate shafts and additional pull rods coupling said intermediate shafts to each other.

15. A combination as defined in claim 13, wherein at least one of said pull rods is of variable length.

16. A combination as defined in claim 13, wherein said conveyor means further comprises sprockets wheels coaxial with said turntables, said chain being trained around said sprocket wheels and said intermediate shafts being provided with rollers engaging the teeth of said sprocket wheels during travel along the respective turntables.

17. A combination as defined in claim 1, wherein said conveyor means comprises an endless chain and said neck rings extending outwardly from and being supported by said chain.

18. A combination as defined in claim 1, wherein said conveyor means comprises an endless chain and said neck rings being carried by and located within the confines of said chain.

19. A combination as defined in claim 18, wherein said conveyor means further comprises sprocket wheels coaxial with said turntables, said chain being trained around said sprocket wheels and each of said sprocket wheels having cutouts for said neck rings.

20. A combination as defined in claim 1, wherein said conveyor means comprises an endless chain supporting said neck rings and sprocket wheels coaxial with said turntables, said chain being trained around said sprocket wheels and further comprising a fixed track for guiding said chain between said sprocket wheels.

21. A combination as defined in claim 1, wherein at least one of said turntables is movable nearer to and further away from the other.

* * * * *